United States Patent [19]

Yamamoto et al.

[11] Patent Number: 5,253,351
[45] Date of Patent: Oct. 12, 1993

[54] MEMORY CONTROLLER WITH A CACHE MEMORY AND CONTROL METHOD OF CACHE MEMORY INCLUDING STEPS OF DETERMINING MEMORY ACCESS THRESHOLD VALUES

[75] Inventors: Akira Yamamoto, Ebina; Toshiaki Tsuboi, Kawasaki; Shigeo Honma, Odawara; Hiroyuki Kitajima, Yokohama; Akira Kurano, Odawara; Masafumi Nozawa, Odawara; Katsunori Nakamura, Odawara; Kosaku Kambayashi, Odawara; Toshio Nakano, Odawara; Yoshiro Shiroyanagi, Odawara, all of Japan

[73] Assignees: Hitachi, Ltd., Tokyo; Microcomputer Engineering Ltd., Kodaira, both of Japan

[21] Appl. No.: 390,832

[22] Filed: Aug. 8, 1989

[30] Foreign Application Priority Data

Aug. 11, 1988 [JP] Japan .................. 63-200877
Sep. 30, 1988 [JP] Japan .................. 63-244128
Nov. 11, 1988 [JP] Japan .................. 63-284992

[51] Int. Cl.⁵ ............................ G06F 12/02
[52] U.S. Cl. ..................... 395/425; 364/DIG. 1; 364/254.3; 364/254.8
[58] Field of Search ... 364/200 MS File, 900 MS File, 364/130; 395/400, 425

[56] References Cited

U.S. PATENT DOCUMENTS

| 4,430,701 | 2/1984 | Christian et al. | 364/200 |
| 4,792,898 | 12/1988 | McCarthy et al. | 364/200 |
| 4,897,783 | 1/1990 | Nay | 395/425 |

FOREIGN PATENT DOCUMENTS

| 0066766 | 12/1982 | European Pat. Off. |
| 0072108 | 2/1983 | European Pat. Off. |
| 080876 | 6/1983 | European Pat. Off. |
| 0109309 | 5/1984 | European Pat. Off. |
| 0130349 | 1/1985 | European Pat. Off. |
| 0164550 | 12/1985 | European Pat. Off. |

OTHER PUBLICATIONS

IBM System Journal, vol. 24, No. 3/4, 1985, Armonk, New York U.S. pp. 316-334; C. P. Grossman: "Cache-DASD storage design for improving system performance".

IBM Technical Disclosure Bulletin, vol. 30, No. 8, Jan. 1988, New York U.S. p. 149 "I/O Sequential direction in cache control units".

IBM Technical Disclosure Bulletin, vol. 34, No. 5, Aug. 1981, New York US pp. 1559-1562; Bennett et al.: "Improving performance of buffered DASD to which some reference are sequential".

*Primary Examiner*—Joseph L. Dixon
*Assistant Examiner*—Hiep T. Nguyen
*Attorney, Agent, or Firm*—Antonelli, Terry, Stout & Kraus

[57] ABSTRACT

In a control unit having a external storage device, a method for selecting a loading method of data stored in the cache memory into the cache memory in accordance with an access pattern to the data, and an apparatus therefor are disclosed. The selection of the loading method is selection of control mode or procedure in accordance with the loading method, and it is attained by a learn function.

31 Claims, 23 Drawing Sheets

FIG. 1
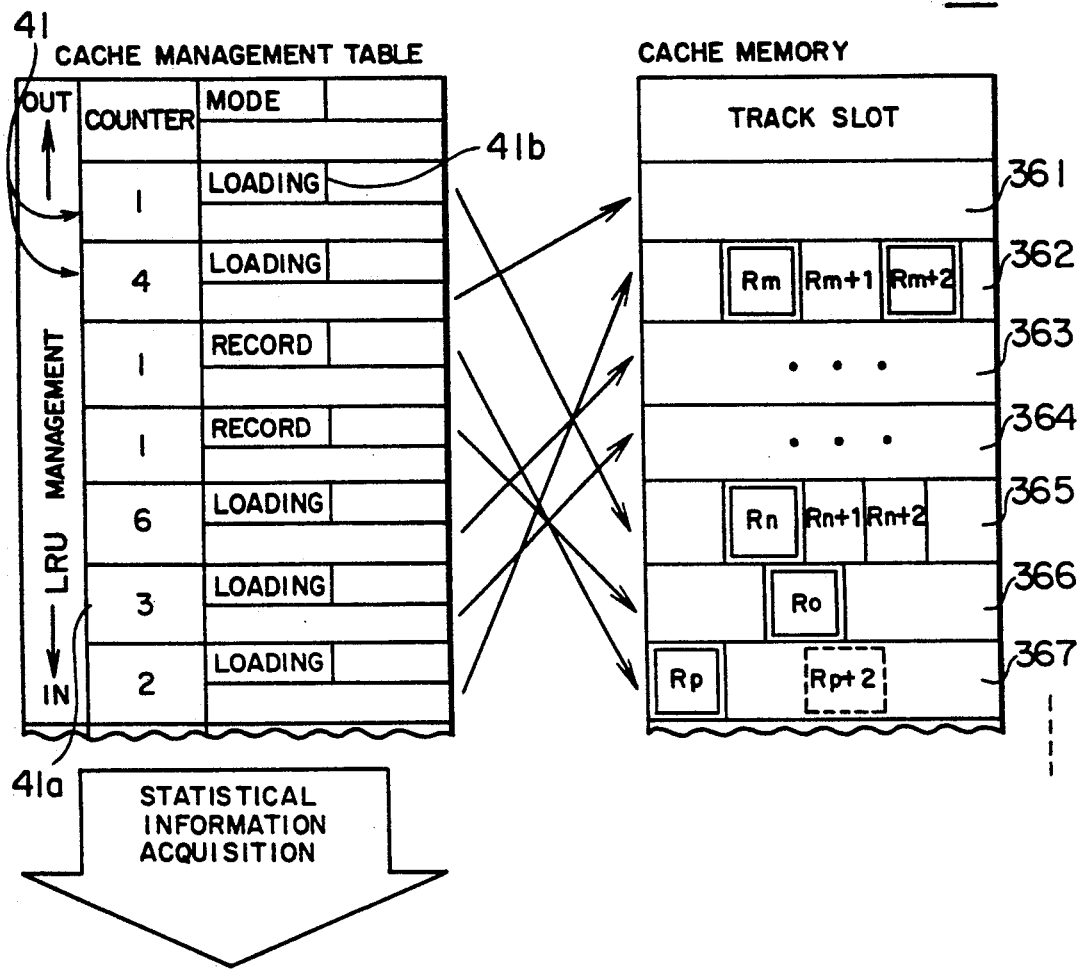
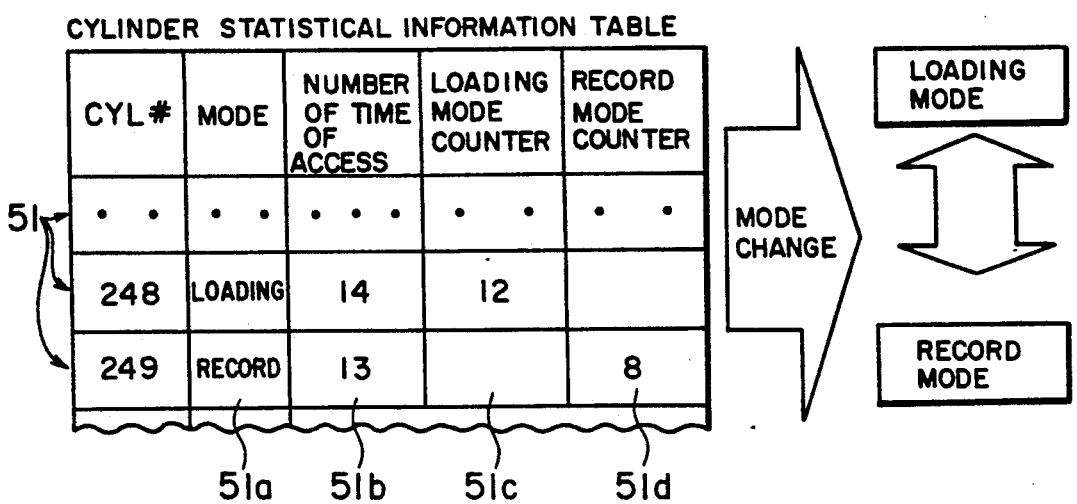

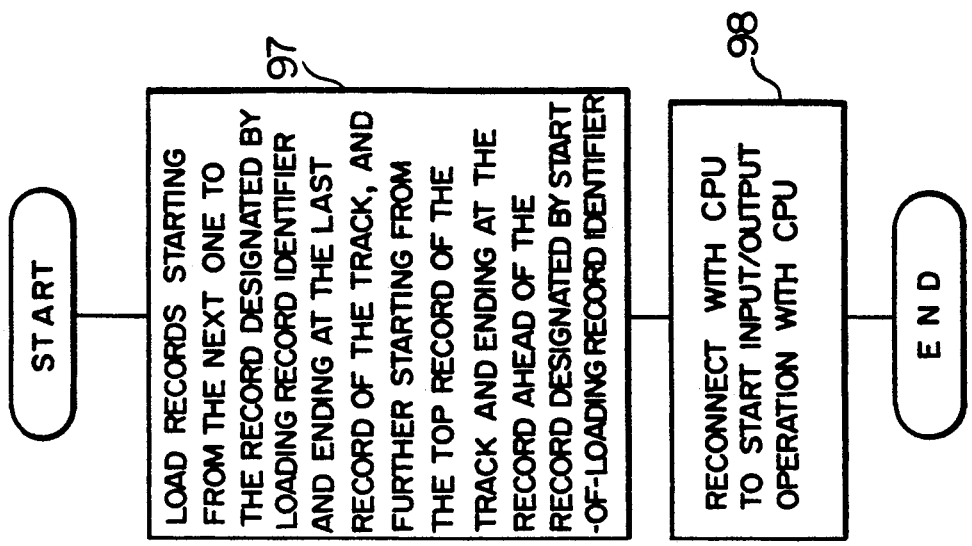
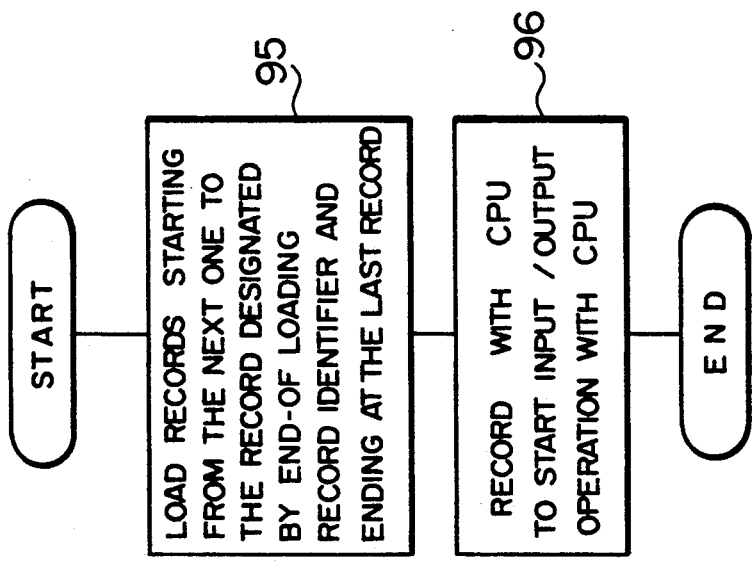
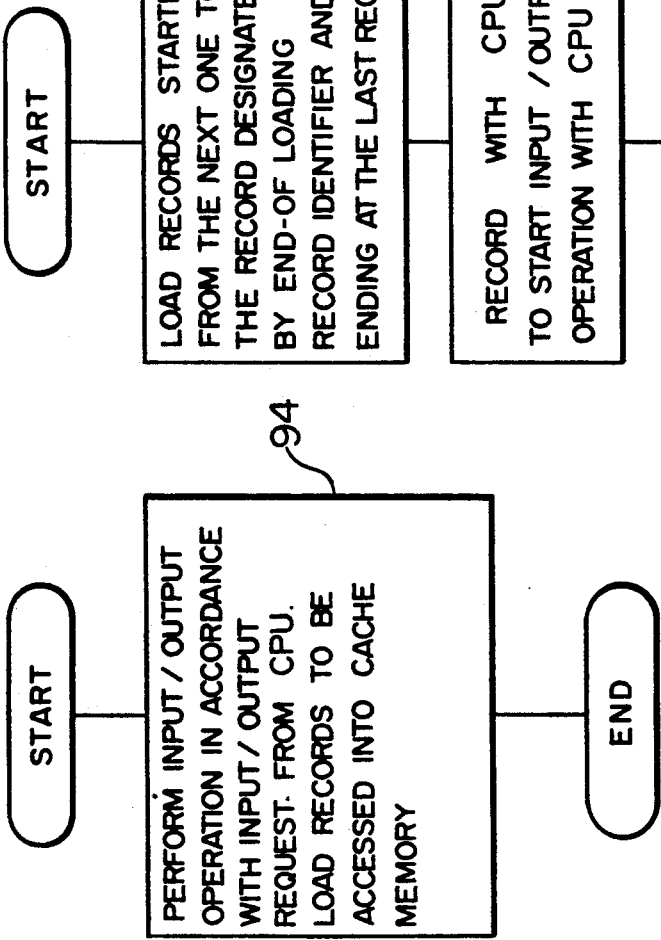

ACCESS PATTERN INFORMATION

| |  |
|---|---|
| SEQUENTIAL CHECK FLAG | ~100 |
| SEQUENTIAL IDENTIFICATION FLAG | ~101 |
| SEQUENTIAL RECOGNITION FLAG | ~102 |
| START / END ADDRESS | ~103 |
| FRONT ACCESS FLAG | ~104 |
| REAR ACCESS FLAG | ~105 |
| ACCESS PART CHECK FLAG | ~106 |
| STATISTICAL INFORMATION | ~107 |

ACCESS PATTERN INFORMATION

| | |
|---|---|
| SEQUENTIAL CHECK FLAG FOR READING | 160 |
| SEQUENTIAL IDENTIFICATION FLAG FOR READING | 161 |
| SEQUENTIAL RECOGNITION FLAG FOR READING | 162 |
| SEQUENTIAL CHECK FLAG FOR WRITING | 163 |
| SEQUENTIAL IDENTIFICATION ADDRESS FOR WRITING | 164 |
| SEQUENTIAL RECOGNITION FLAG FOR WRITING | 165 |
| START / END ADDRESS | 103 |
| FRONT ACCESS FLAG | 104 |
| REAR ACCESS FLAG | 105 |
| ACCESS PART CHECK FLAG | 106 |
| STATISTICAL INFORMATION | 107 |

ACCESS PATTERN INFORMATION

| | |
|---|---|
| SEQUENTIAL CHECK FLAG FOR READING | 160 |
| SEQUENTIAL IDENTIFICATION ADDRESS FOR READING | 161 |
| SEQUENTIAL RECOGNITION FLAG FOR READING | 162 |
| SEQUENTIAL CHECK FLAG FOR WRITING | 163 |
| SEQUENTIAL IDENTIFICATION ADDRESS FOR WRITING | 164 |
| SEQUENTIAL RECOGNITION FLAG FOR WRITING | 165 |
| START / END ADDRESS | 103 |
| FRONT ACCESS FLAG | 104 |
| REAR ACCESS FLAG | 105 |
| MOST ACCESS FLAG | 170 |
| TRACK MISS OCCURRENCE TIME | 171 |
| ACCESS PART CHECK FLAG | 106 |
| STATISTICAL INFORMATION A | 172 |

MEMORY CONTROLLER WITH A CACHE MEMORY AND CONTROL METHOD OF CACHE MEMORY INCLUDING STEPS OF DETERMINING MEMORY ACCESS THRESHOLD VALUES

BACKGROUND OF THE INVENTION

The present invention relates to a cache control technique and an information processing technique, and more particularly to technique which is effective in providing efficient operation of a cache memory provided in a control unit interposed between a control processing unit and an external storage of an information handling system. It also relates to a technique which is suitable for loading of data into the cache memory.

The inventors of this invention filed a Japanese Patent Application now published as JP-A-60-196860.

A magnetic disk device which is used as the external storage has an advantage of realizing a large storage capacity with a relatively low cost. However, due to the waiting time for rotation of a magnetic disk which serves as the storage medium and a seek operation of the head, there is a limit to the improvement of the accessing speed which may be achieved in recording and reproducing data.

In a computer system which uses a magnetic disk device as an external storage, a cache memory which comprises a semiconductor memory capable of being accessed faster than the magnetic disk device is provided in a magnetic disk control unit which is interposed between a central processing unit and the magnetic disk device so that the magnetic disk control unit may store a portion of the data stored in the magnetic disk device and respond to an access from the central processing unit. In this manner, the large difference between the operation speeds of the magnetic disk device and the central processing unit is compensated. It is a usual practice to make the exchange of data between the magnetic disk device and the central processing unit efficient.

In such a system, it is important from a standpoint of more efficient function of the cache memory to increase the probability that desired data accessed from the central processing unit is present in the cache memory, that is, that the hit rate is as high as possible. To this end, the following various techniques have been proposed heretofore.

In the technique disclosed in JP-A-55-154648, a storage area of the magnetic disk device is divided into a plurality of areas. A different operation mode is preset for each of the divided storage areas, and the operation mode corresponding to the storage area designated by an input/output command from the central processing unit is selected. In this manner, the hit rate is improved.

In the technique disclosed in JP-A-60-14360, statistical data for hit and miss are collected by the disk control unit. The collected statistical data is transferred to the central processing unit. Based on the statistical data, an operator or a system manager determines whether the current utilization status of the cache memory is optimum or not, and based on the result of determination, the extent of data to be loaded from the magnetic disk device to the cache memory, that is, the extent of cache loading, is appropriately controlled. In this manner, the transfer efficiency of the data between the central processing unit and the magnetic disk device is improved.

In the paper of the 29th Joint Conference of the Information Processing Society of Japan, pp. 169-170, it is proposed that the disk control unit detects a sequential access, and after the sequential access to a track has been completed, that track is treated as data which may be purged from the cache memory at a highest priority.

SUMMARY OF THE INVENTION

It is an object of the present invention to provide a cache control technique which permits effective utilization of the cache memory by automatically selecting an optimum cache operation mode (data loading mode) in response to variation of an access pattern from the central processing unit (hereinafter the term central processing unit represents a unit which accesses to an external storage such as a disk device) to the external storage.

It is another object of the present invention to provide an information handling system which permits an improvement in the transfer efficiency of data between the central processing unit and the external storage with the intervention of the cache memory.

It is other object of the present invention to provide a loading method which permits the reduction of a loading overhead in the disk cache where a cache allocation unit is a track unit which makes it possible to comprise records of variable length.

It is a further object of the present invention to provide a loading method which improves the hit rate and reduces the loading overhead by grasping access characteristics of respective input/output requests in the disk control unit.

The above and other objects and new features of the present invention will be apparent from the description of the specification and the accompanying drawings.

Some of the above-mentioned objects have been established based on the recognition of the following problems.

In a disk control unit having a cache memory, it is very important from a standpoint of performance to improve the probability of presence of data to be accessed in the cache memory, that is, a hit rate. To this end, it is necessary to load data which conforms to the access characteristic of the input/output data into the cache memory. In this case, an additional load for loading is imposed on the disk control unit. Thus, the disk control unit should detect the access characteristics of the input/output requests and determine the loading method depending on the detection result in order to obtain an improvement in the hit rate and the reduction of the loading in balance.

In the prior art techniques, no consideration has been paid to the following points.

In JP-A-55-154648, the disk control unit directs the access characteristic of the I/O request from the central processing unit and the loading method (operation mode) is selected in accordance with the access characteristic. Accordingly, this imposes a load on the central processing unit. If the control processing unit cannot recognize the access characteristic, the appropriate loading method for the cache memory cannot be selected.

Since the operation mode is fixed for each of the divided storage areas, the utilization efficiency of the cache memory may not be optimally maintained if the access pattern from the central processing unit to the disk device changes from time to time in the same storage area.

Namely, it is difficult to comply with a system environment where a file in one storage is commonly used by on line processing which primarily uses random accessing and batch processing which primarily uses sequential accessing.

In JP-A-60-14360, it is the operator or a system manager who determines the statistical information devised in the magnetic disk control unit. Accordingly, where the access pattern from the central processing unit to the magnetic disk device changes from application to application, it may be practically impossible to optimally control the extent of cache loading (extent of data to be loaded into the cache memory) from time to time to comply with the application to be performed.

In the article of the Institute of Information Processing of Japan, the sequential access which is a typical access pattern to the disk device is recognized. Based on the recognition result, the accessed track is rendered to be most likely to be purged from the cache memory. The recognition result is not used to select the loading method.

In general, the length of the record in the track of the disk device is variable and hence the loading method based on the management for each track unit is required.

Representative features of the present invention are outlined below.

The cache control method of the present invention has a plurality of cache operation modes and a learn function which permits automatic switching of the cache operation mode in accordance with the operation status of the cache operation mode.

The information handling system of the present invention comprises a host processing unit, an external storage and a disk control unit with a cache memory interposed between the host processing unit and the external storage for storing a portion of data of the external storage, the disk control unit having a plurality of cache operation modes and a learn function which permits automatic switching of the cache operation mode in accordance with the operation status of the cache operation mode.

The above objects of the present invention are attained in the following manner.

The disk control unit is connected to the disk device and the central processing unit and has a cache memory where physical area on this disk device is a cache allocation unit (an allocation unit of the cache memory). If none of the data on the physical area in the disk device to be accessed from the central processing unit exists in the cache memory, initial loading is performed to load only the data in the physical area to be accessed from the central processing unit into the cache memory. If an access is thereafter made to the data which is in the cache management unit and which is other than the data already stored in the cache memory, the data which is in the cache management unit and which is other than the data already stored in the cache memory is additionally loaded into the cache memory.

Further, the above objects of the present invention are achieved in the following manner. The input/output requests are classified into the sequential access and other input/output requests. With the sequential access, it is easy to determine an efficient loading method whose access characteristic is easy to understand. If it is recognized as the sequential access, a plurality of tracks are preread and loaded from the track which is currently being accessed. If it is recognized as other than the sequential access, the partial data in the cache allocation unit (normally track) to be accessed by the input/output request is accessed from the central processing unit while the cache allocation unit which resides in the cache memory is predicted based on statistical information, and only that partial data is loaded. In this manner, the improvement of hit rate and the reduction of the loading load are effected in balance.

In accordance with the cache control method of the present invention, whether the current operation status of the cache operation mode is optimum or not can be exactly determined by monitoring whether statistical information, such as a ratio of the number of times of access from the central processing unit to number of times of valid or invalid operations of the currently selected cache operation mode, exceeds a predetermined threshold. Depending on the determination, another more appropriate cache operation mode is automatically selected.

Thus, even if the access pattern from the central processing unit changes from time to time, the cache memory may be effectively utilized while the optimum cache operation mode is always maintained.

In accordance with the information handling system of the present invention, whether the current operation status of the cache operation mode is optimum or not is determined by monitoring whether the statistical information, such as the ratio of the number of times of access from the central processing unit to the number of times of valid or invalid operations of the currently selected cache operation mode, exceeds the predetermined threshold. Depending on the determination, another more appropriate cache operation mode is automatically selected.

Thus, even if the access pattern from the central processing unit changes from time to time, the cache memory may effectively function while the optimum cache operation mode is maintained. In this manner, the exchange efficiency of information between the central processing unit and the external storage with the intervention of the cache memory is improved.

In the data loading method of the present invention, if the record in the track to be accessed by the input/output request from the central processing unit does not exist in the cache memory, the records to be loaded into the cache memory are those records which are to be accessed by the input/output request. Thereafter, if an access is made to that track while the records are residing in the cache memory, and if the record to be accessed is one which is behind the records stored in the cache memory, the records which are behind the records stored in the cache in the track, are loaded into the cache memory. If the record to be accessed is one which is ahead of the records stored in the cache memory, the remaining records in the track are loaded into the cache memory.

BRIEF DESCRIPTION OF THE DRAWINGS

FIG. 1 a conceptional view for explaining an operation in a cache control method in accordance with one embodiment of the present invention;

FIGS. 10 to 12 show process flow charts of operations of the processor in other embodiments of the present invention;

FIG. 20 shows a structure of access characteristic information;

FIG. 24 shows a process flow chart of operations to be carried out when a sequential check flag of the track to be accessed by the accepted input/output request is ON;

FIG. 28 shows a process flow chart of operations to be accessed when the input/output request to the track is received while the access check flag is ON;

FIG. 31 shows a structure of access characteristic information when the recognition of the sequential access is independently conducted for reading and writing;

FIG. 33 shows a structure of access characteristic information when the recognition of the sequential access is independently conducted for reading and writing and the pattern without loading is prepared;

DESCRIPTION OF THE PREFERRED EMBODIMENTS

The embodiments of the present invention will now be explained with reference to the accompanying drawings.

Figure 2:
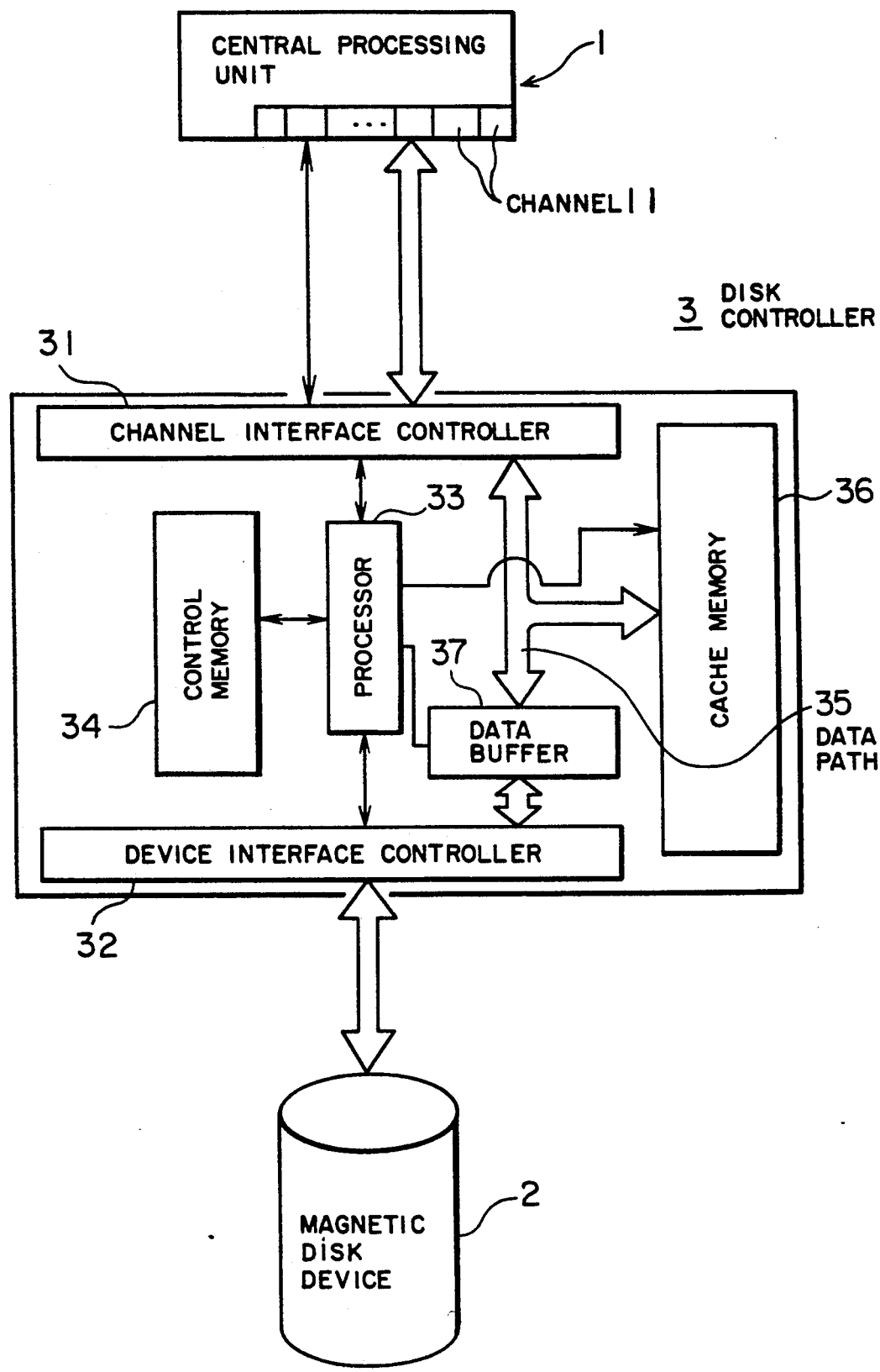
FIG. 2 is a block diagram of a configuration of an information handling system to which the present cache control method is applied.

FIG. 1 is a conceptional view for explaining an operation in a cache control method in accordance with one embodiment of the present invention. FIG. 2 shows a block diagram of an information handling system to which the present cache control method is applied.

Referring to FIG. 2, the configuration of the information handling system of the present embodiment is explained.

Between a central processing unit (which may also be referred to as a host system) 1 which is a portion of a general purpose computer and a magnetic disk device 2 which serves as an external storage, a disk control unit (controller) 3 for controlling the exchange of data and commands there between is provided. While one disk device 2 is shown in FIG. 2, a plurality of disk devices are usually connected to one disk control unit 3.

The central processing unit 1 is provided with a channel unit 11 which controls the exchange of data and commands between the central processing unit 1 and external units.

On the other hand, the disk control unit 3 is provided with a channel interface controller 31 and a device interface controller 32, which control the exchange of data and commands between the channel unit 11 and th disk control unit 3 and controls the exchange of data between the disk control unit 3 and the magnetic disk device 2, respectively.

Between the channel interface controller 31 and the device interface controller 32, a processor 33 for controlling those controllers and a control memory 34 which stores a control program for the processor 33 are provided.

The channel interface controller 31 and the device interface controller 32 are interconnected through a data path 35.

A cache memory 36 which may comprise a semiconductor memory having a much faster operation speed than that of the magnetic disk device 2 is arranged in a portion of the data path 35.

Of the data stored in the magnetic disk device 2, that data which has a high probability of being accessed from the central processing unit 1 through the host channel unit 11 is previously copied into the cache memory 36 and the access request from the central processing unit 1 is responded to by the data stored in the cache memory 36 so that the efficiency of data exchange between the high speed channel unit 11 and the low speed magnetic disk device 2 is improved.

In the data path 35, a data buffer 37 is arranged at a point closer to the device interface controller 32 than to the cache memory 36 in order to temporarily store the data exchanged between the device interface controller 32 and the cache memory 36 or between the device interface controller 32 and the channel interface controller 31.

The operations of the cache memory 36 and the data buffer 37 are controlled by the microprocessor 33.

Figure 3:
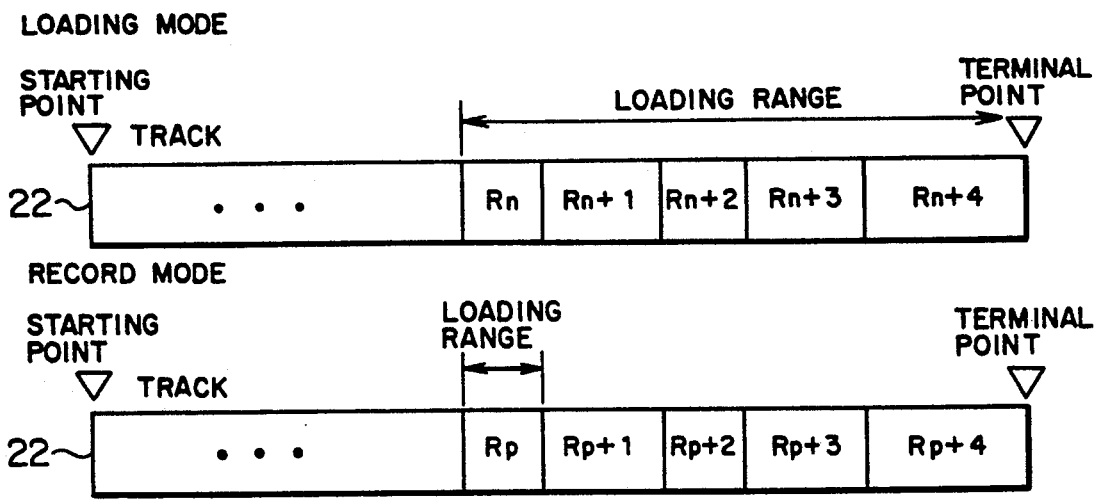
FIG. 3 is a conceptional view for explaining a cache operation mode in the cache control method in accordance with the embodiment of the present invention.
Figure 4:
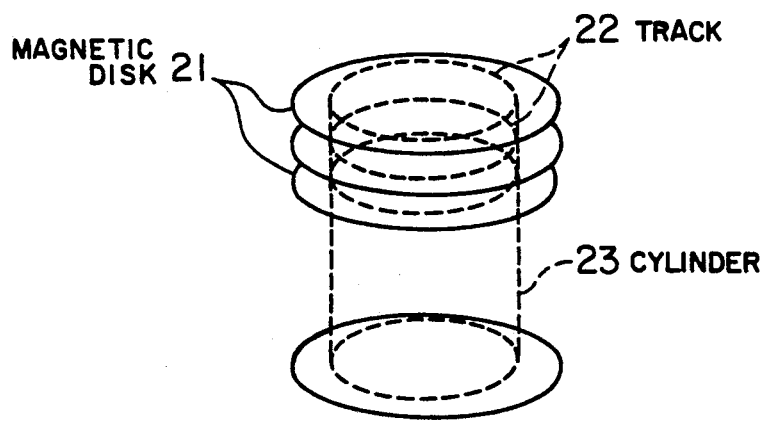
FIG. 4 is a conceptional view of a configuration of an external storage.

On the other hand, in the magnetic disk device 2, a plurality of concentric tracks 22 are provided on both sides of each of magnetic disks 21 which serve as the storage media, as shown in FIG. 4, and a plurality of records which are data recording units comprise stored on each of the tracks 22 as shown in FIG. 3.

On each side of each of the magnetic disks 21, a plurality of heads (not shown) which are simultaneously moved in the same direction radially of the magnetic disk 21 while keeping an equal distance from the center of rotation of the magnetic disk 21 in order to position the heads onto the desired tracks, that is, carry out the seeking operation are arranged to face each other. The data such as the record is recorded and reproduced to and from any track 22 through the head.

A cylinder 23 comprises a group of tracks 22 which can be rapidly and continuously accessed only by the selection of the heads without radially displacing the heads on the magnetic disk 21, that is, without the seek operation which takes a long time.

The access to any record from the host central processing unit is effected by designating the cylinder number of the cylinder, the head number (track number) of the head (not shown) and the record number.

In this case, as shown in FIG. 1, the cache memory 36 is provided with a plurality of track slots 361-367 which correspond to some of the tracks 22 of the magnetic disk device 2. Data such as record R stored in any track 22 of the magnetic disk device 2 is copied (loaded) to the track slots 361-367 in an equivalent record format to that stored in the track 22.

Thus, if the desired data exists in the cache memory 36 when the channel unit 11 accesses, high speed access is attained.

The track slots 361-367 in the cache memory 36 are managed by the cache management table 4.

The cache management table 4 has a plurality of entries 41 which correspond to the track slots. Each of the entries 41 contains storage location information (cylinder number, track number, etc.) (not shown) on the magnetic disk 21 of the track 22 of the source data stored in the track slots, and a pointer (not shown) which points to the storage location of the track slot in the cache memory 36.

Each entry 41, that is, each track slot belonging to each entry 41 is controlled by a least recently used law (LRU law) in the cache management table 4.

When an access request is issued from the central processing unit 1 to the magnetic disk device 2 through the channel unit 11, the cache management table 4 is first accessed to check whether the desired data is present in the cache memory 36. If the desired data is present (hereinafter referred to as a hit), a high speed access is attained by using the data in the cache memory 36. On the other hand, if the desired data is not present (hereinafter referred to as a miss), the access is made directly to the magnetic disk device 2.

In the case of a miss, the data fetched from the magnetic disk device 2 to the channel unit 11 is also copied into the cache memory 36 for use in the next access. In copying the data, a track slot to be released is selected. Of the track slots 361-367 of the cache memory 36, the one which has been accessed least recently, that is, the one which corresponds to the lowest order (OUT) entry 41 in the LRU law of the cache management table 4 is selected. The entry 41 which corresponds to the copied track slot is ranked to the top order (IN) of the LRU management.

Namely, the recently accessed data is assumed to have high probability that it will be accessed in the near future. Accordingly, it is maintained in the cache memory 36 as long as possible. The track slot in which the least recently accessed data is stored is released for the copying of the new data. In this manner, the hit rate is improved.

In the present embodiment, at least two cache operation modes described below are provided to define the loading method of the desired data from the magnetic disk device 2 to the cache memory 36 in the case of a miss. They are a loading mode and a recording mode.

As shown in FIG. 3, if an access is made to a record Rn of the records stored in any track 22 of the magnetic disk device 2, it is determined that a probability of the access to the record stored behind (not necessarily continuous) the record Rn is high. All records from the one adjacent to the record Rn to the last one of the track are copied into the predetermined track slots of the cache memory 36. This is the loading mode. In the record mode, only the record Rp which has been accessed is copied in order to minimize the time required for the copying and the occupation time of the data path 35.

Each of the entries 41 of the cache management table 4 is constructed in the following manner. As shown in FIG. 1, the entry 41 is constructed such that a counter 41a which is incremented in accordance with the condition to be described later in accessing to the track slot which belongs to the entry 41 and mode identification information 41b for identifying the current cache operation mode are recorded.

In the present embodiment, a cylinder statistical information table 5 having a plurality of entries 51 corresponding to the cylinder 23 which include the tracks 22 (track slots) which are at the same distance from the center of rotation of the magnetic disk 21, is provided. The cache operation mode in each track slot is recorded by cylinder 23.

Each entry 51 in the cylinder statistical information table 5 includes mode identification information 51a for recording a current cache operation mode of the cylinder 23 corresponding to that entry 51, an access count record are 51b for recording a total number of times of access to that cylinder 23, a loading mode counter 51c which is incremented by one at a timing to be described hereinafter based on the content of the counter 41a in the cache management table 4, and a record mode counter 51d.

In the present embodiment, the cache operation mode is automatically switched from time to time for each cylinder 23 in accordance with the ratio of the access count record area 51b to the count of the loading mode counter 51c or the record mode counter 51d.

Figure 5:
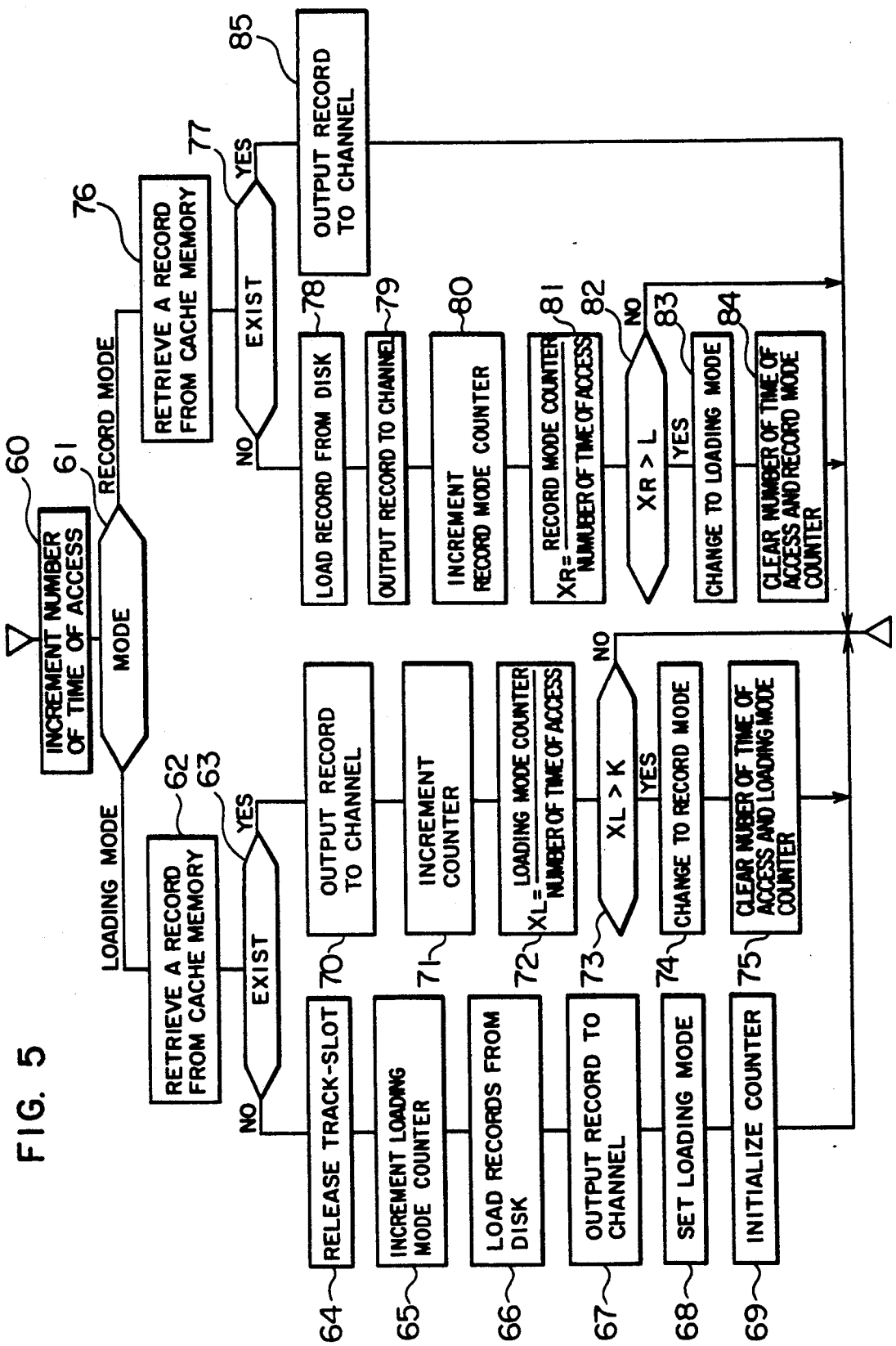
FIG. 5 is a flow chart showing an operation of the cache control method in accordance with the embodiment of the present invention.

An operation of the cache control system of the present embodiment is now explained with reference to FIG. 5.

The central processing u it 1 directs the cylinder number, the head number (track number) and the record number to the disk control unit 3 through the channel unit 11 to request the access to the magnetic disk device 2. In response thereto, the process of FIG. 4 is started.

The disk control unit 3 increments the access count record area 51b of the corresponding cylinder number CYL# of the cylinder statistical information table 5

(step 60). Then, it determines the cache operation mode of the cylinder (step 61).

The following explanation is directed to the loading mode.

In the landing mode, the cache memory 36 is searched based on the directed cylinder number and track number to find the desired record (step 62). If the desired record is not found (step 63), a track slot into which the desired record is to be loaded is released (step 64). The release of the track slot will be explained later. Records $R_{m+1}$ and $R_{m+2}$ which succeed the desired record Rm to which the central processing unit 1 requested access are loaded along with record Rm (step 66). The loading is attained by loading the three records into a predetermined track slot, for example, the track slot 362, according to the LRU law, from the track 22 of the corresponding cylinder number and track number of the magnetic disk unit 2. In parallel with the loading or after the loading into the track slot, the desired record Rm is sent to the channel unit 11 (step 67). The entry 41 of the cache management table 4 indicates the loading mode (step 68). An initial value "1" is set into the counter 41a of the corresponding entry 41 of the cache management table 4 corresponding to that track slot (step 69).

If an access request is thereafter issued to the succeeding record $R_{m+2}$ in the track slot 362, it may be rapidly accessed because it is retained in the cache (step 70). In this case, the disk control unit 3 increments the counter 41a of the entry 41 corresponding to the track slot 362 in the cache management table 4 (step 71).

Accordingly, the track slot 362 which is now in the loading mode has been accessed twice in total, that is, once for the top record Rm at the beginning of the loading and once for the succeeding record $R_{m+2}$. Thus, the count of the counter 41a of the cache management table 4 is now "2".

Thus, by checking the counter 41a, it is determined how many times the track slot which is now in the loading mode has been accessed.

If it has been accessed only once (only at the time of loading), the count of the counter remains at the initial value "1". For example, the count of the counter 41a of the track slot 365 which is also in the loading mode is "1" indicating that only the head record Rn has been accessed at the beginning of the loading.

It is assumed that the track slot 365 which is now in the loading mode is at the position which will be released from the cache memory 36 when new data is to be next loaded into the cache memory, that is, at the lowest order position, in the LRU law, of the entry 41 of the cache arrangement table 4 corresponding to the track slot 365.

In the present embodiment, when the track slot 365 which is in the loading mode is released (step 64), the loading mode counter 51c in the entry 51 of the cylinder 23 to which the track slot 365 belongs in the cylinder statistical information table 5 is incremented by one if the count of the counter 41a of the entry 41 corresponding to the track slot 365 in the cache management table 4 is smaller than a predetermined value ("2" in the present embodiment) (step 65).

Thus, the count of the loading mode counter 51c in the cylinder statistical information table 5 indicates the number of times those track slots in the cylinder 23 were released without access to the record other than the head record of the track slot after the loading into the cache memory 36 in the loading mode.

Each time the access is made to the cylinder 23, the disk control unit 3 determines a ratio $X_L$ of the count of the access count record area 51b (step 72):

If the ratio $X_L$ is higher than a predetermined value K (K=0.8 in the present embodiment) (step 73), it is determined that the copying of a plurality of records in the same track in the loading mode is not effective in the loading from the magnetic disk device 2 to the cache memory 36, and the cache operation mode is switched from the current loading mode to the record mode (step 74).

At the same time, the access count record area 51b and the loading mode counter 51c of the entry 51 corresponding t the cylinder 23 of the cylinder statistical information table 5 are cleared (step 75).

For example, in the cylinder statistical information table 5 of FIG. 1, the counts of the access count record area 51b and the loading mode counter 51c of the entry 51 at the cylinder number CYL #248 are "14" and "12," respectively, and $$X_L = 12/14 \approx 0.85$$

Since $X_L$ is higher than the predetermined value "0.8", it is determined that the change of the operation mode is necessary.

As a result, the disk control unit 3 loads the records from the tracks 22 belonging to the cylinder 23 having the cylinder number 248 to the cache memory 36 in the record mode until it is determined that the record mode is not proper.

On the other hand, if the cylinder 23 to which the access request has been issued from the central processing unit 1 is in the record mode (step 61), the cache memory 36 is first searched based on the directed cylinder number, track number and record number to find the desired record (step 76).

If the access is made to the succeeding record $R_{p+2}$ in the track 22 corresponding to the track slot 367 which is in the record mode, the desired record $R_{p+2}$ does not exist in the cache memory 36 (step 77). Accordingly, the record should be loaded from the track 22 of the magnetic disk device 2 to the cache memory 36 (step 78). The record is supplied to the channel unit 11 (step 79).

In the present embodiment, the disk control unit 3 increments the record mode counter 51d of the entry 51 corresponding to the cylinder 23 to which the track of the cylinder statistical information table 5 belongs (step 80).

The record mode counter 51d of the entry 51 corresponding to the cylinder 23 indicates the number of the cases where the loading in the record mode was not sufficient, because when the succeeding record on the track 22 was accessed only one record was loaded into the cache memory 36 from any one of the tracks 22 belonging to the cylinder 23.

Each time the access is made to that cylinder, the ratio $X_R$ of the count of the record mode counter 51d to the count of the access count record area 51b is calculated (Step 81). If the ratio XR is higher than a predetermined value L (L=0.6 in the present embodiment) (step 82), the cache operation mode is switched from the current record mode to the loading mode (step 83).

The access count record area 51b and the record mode counter 51d of the entry 51 corresponding to the cylinder 23 of the cylinder statistical information table 5 are cleared (step 84).

For example, in the entry 51 having the cylinder number 249 of the cylinder statistical information table 5 of FIG. 1, the counts of the access count record area 51b and the record mode counter 51d are 13 and 8, respectively, and $$X_R = 8/13 \approx 0.62$$

Since $X_R$ is larger than the predetermined value 0.6, it is necessary to change the cache operation mode.

Accordingly, the disk control unit 3 loads the records from the track 22 belonging to the cylinder 23 having the cylinder number 249 to the cache memory 36 in the loading mode until it is determined that the loading mode is not proper.

If the desired record exists in the cache memory 36 in the record mode, the record is supplied to the channel unit (step 85).

In the present embodiment, the disk control unit 3 has a learning function to automatically switch the cache operation mode between the loading mode and the record mode for each cylinder from time to time in accordance with the operation status of the cache operation mode grasped based on the statistical information derived from the counter 41a and the mode information area 41b provided in each of the entries 41 of the cache management table 4 as well as the access count record area 51b, the loading mode counter 51c and the record mode counter 51d provided in each of the entries 51 of the cylinder statistical information table 5.

Accordingly, even if the access pattern to the data stored in the magnetic disk device 2 from the central processing unit 1 changes from time to time for various reasons, the optimum cache operation mode can always be maintained without manual intervention.

Thus, the cache memory 36 can always be utilized with a maximum effectiveness.

Further, the efficiency of data exchange between the central processing unit 1 and the magnetic disk unit 2 in the information handling system comprising the central processing unit 1, the magnetic disk devices 2 and the disk control unit 3 is significantly improved.

While the present invention has been specifically explained with reference to a preferred embodiment, it should be noted that the present invention is not limited to the above embodiment but various modifications thereof may be made without departing from the subject matter of the invention.

For example, in the above embodiment, the magnetic disk devices are controlled by one disk control unit. Alternatively, they may be controlled by a plurality of magnetic disk control units. In this case, the statistical information is shared by the respective disk control devices.

In the above embodiment, the magnetic disk subsystem, comprising the magnetic disk devices and the disk control unit, is connected to one central processing unit. Alternatively, it may be shared by a plurality of central processing units.

In the above embodiment, the cache operation mode and the statistical information are managed for each cylinder. Alternatively, they may be managed on a volume basis or on a data set basis.

It should be understood that the cache operation mode is not limited to that described in the above embodiment.

In accordance with the cache control method of the present invention, the control unit which is interposed between the central processing unit and the external storage and which has the cache memory for storing a portion of data, has a plurality of cache operation modes and a learning function to automatically switch the cache operation mode in accordance with the operation status of the cache operation mode. Whether the statistical information, such as the ratio of the number of times of access from the central processing unit to the number of times of valid or invalid operation of the currently selected cache operation mode, exceeds the predetermined threshold or not is monitored to determine the appropriateness of the operation status of the current cache operation mode. Thus, another more appropriate cache mode is automatically selected if necessary.

As a result, even if the access pattern from the central processing unit changes from time to time, the optimum cache operation mode can always be maintained so that the cache memory can be effectively utilized.

In the information handling system of the present invention, there is provided the central processing unit, the external storage and the control unit which is interposed between the central processing unit and the external storage and which has the cache memory for temporarily storing a portion of data of the external storage. It has a plurality of cache operation modes and a learning function to automatically switch the cache operation mode in accordance with the operation status of the cache operation mode. Whether the statistical information, such as the ratio of the number of times of access from the central processing unit to the number of times of valid or invalid operation of the currently selected cache operation mode, exceeds the predetermined threshold or not is monitored to determine the appropriateness of the operation status of the current cache operation mode. Another more appropriate cache operation mode is automatically selected if necessary.

Thus, even if the access pattern from the central processing unit changes from time to time, the optimum cache operation mode can always be maintained so that the cache memory functions effectively and the efficiency of the information exchange between the central processing unit and the external storage between which the cache memory is interposed is improved.

Another embodiment for improving the efficiency of information transfer between the central processing unit and the external storage, by the disk control unit having the cache memory is now explained. In the present embodiment, the improvement of the hit rate and the reduction of the loading overhead are particularly explained.

Figure 6:
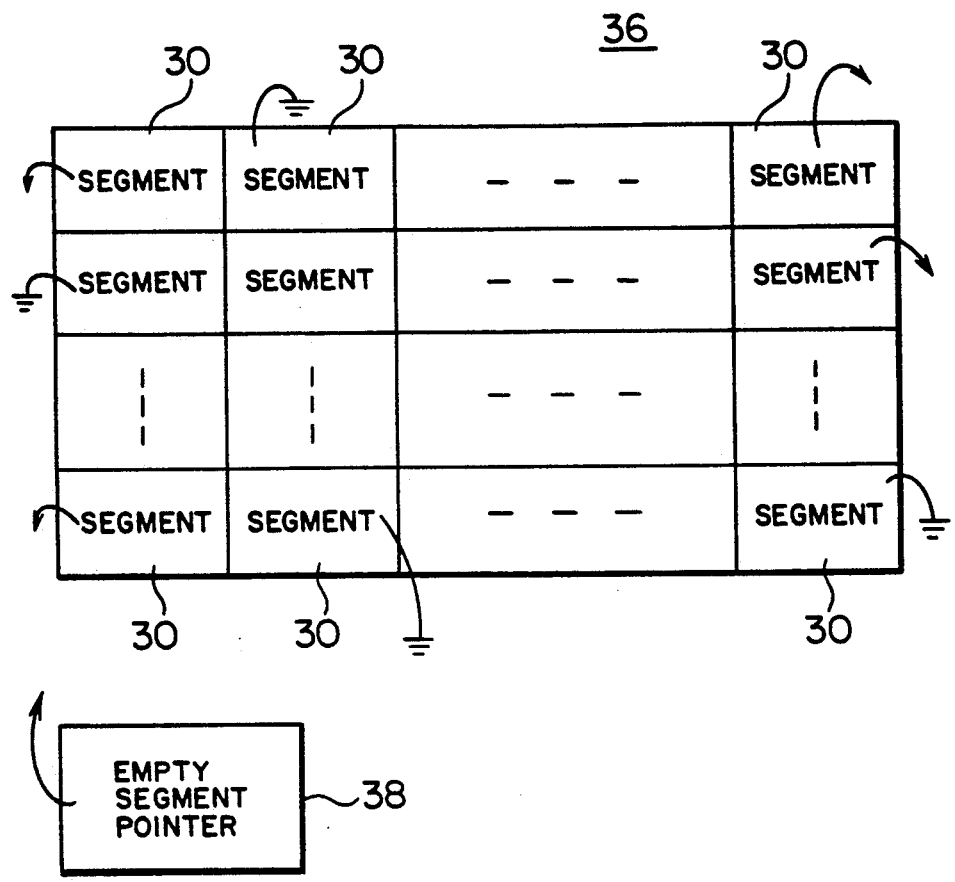
FIG. 6 shows a configuration of a cache memory.

FIG. 6 shows a configuration of the cache memory 36. The cache memory 36 is divided into fixed length segments 30. It is assumed that a fixed number (one or more) of segments 30 are required to store one track of the magnetic disk device 2.

First, it is assumed that a plurality of segments 30 are required to store one track. In this embodiment, the number of segments 30 required is assumed to be n. An empty segment pointer 38 points to a set of empty segments 30. Each of the segments 30 has a pointer which points to a next empty segment if the segment 30 is empty. The pointer of the last empty segment 30 is null.

Figure 7:
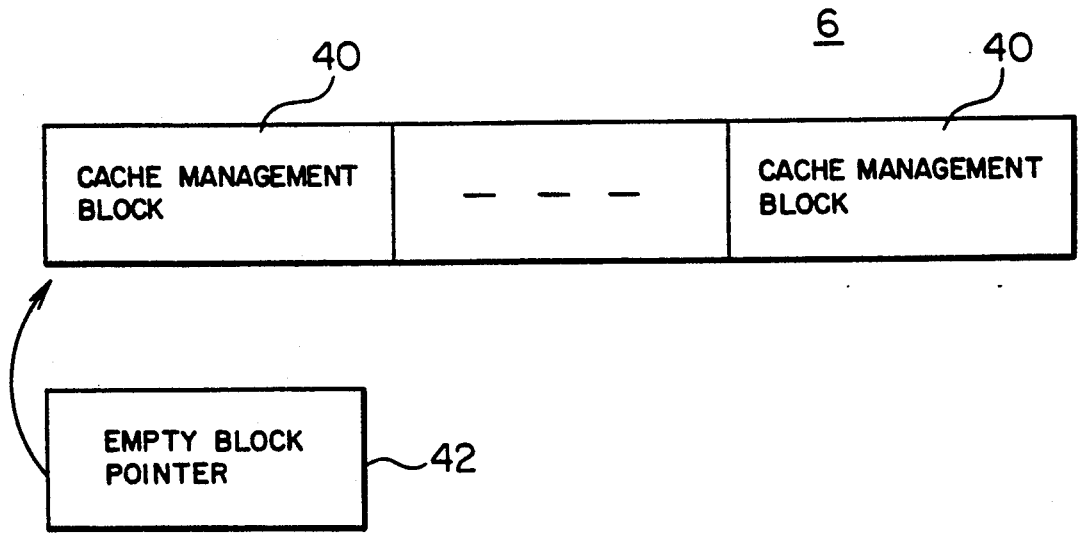
FIG. 7 shows a configuration of a cache management table.

FIG. 7 shows a structure of a cache management table 6, which is identical to that shown in FIG. 1 but only a portion of which that is necessary for explaining the present embodiment is shown. The cache management table 6 comprises cache management blocks 40 provided one for each track to which one or more segments 30 in the cache memory 36 are allocated. An empty block pointer 42 is a pointer to the top cache management block 40 in a set of empty cache management blocks 40.

Figure 8:
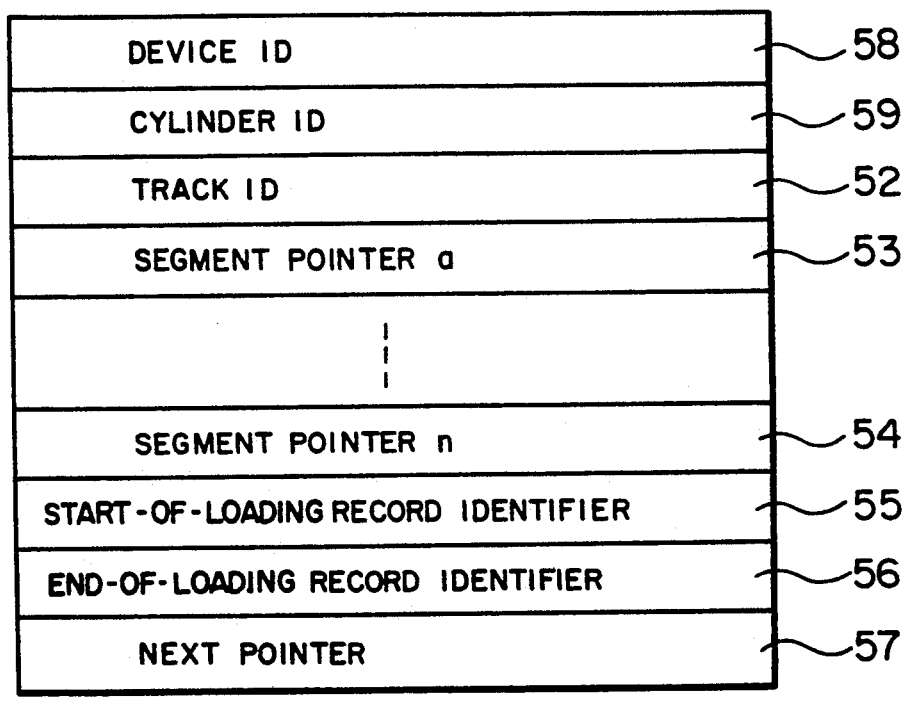
FIG. 8 shows a configuration of a cache management block.

FIG. 8 shows a structure of the cache management block 40, in which a device ID 58, a cylinder ID 59 and a track ID 52 are identifiers of the disk device 2, the cylinder and the track on the disk device 2 corresponding to the cache management block respectively. Segment pointer a 53 to segment pointer n 54 are pointers to n segments 30. Of those pointers, only those which are equal in number to the segments which store the portion stored in the cache memory 36 in the corresponding track are valid, and the remaining pointers are null. The valid pointers serve as the pointers to the corresponding segments 30.

A start-of-loading record identifier 55 is an identifier for a record from which the loading into the cache memory was started, for example, a start position of the loading of the track on the disk device 2 of the record, and an end-of-loading record identifier 55 is an identifier for the record which was lastly loaded into the cache memory 36. The records in the range designated by the start-of-loading record identifier 55 and the end-of-loading record identifier 56 are loaded into the cache memory 36. A next pointer 57 is a pointer to the next cache management block 40 when the current cache management block 40 is empty. If there is no other empty cache management block 40, it is null.

Figure 9:
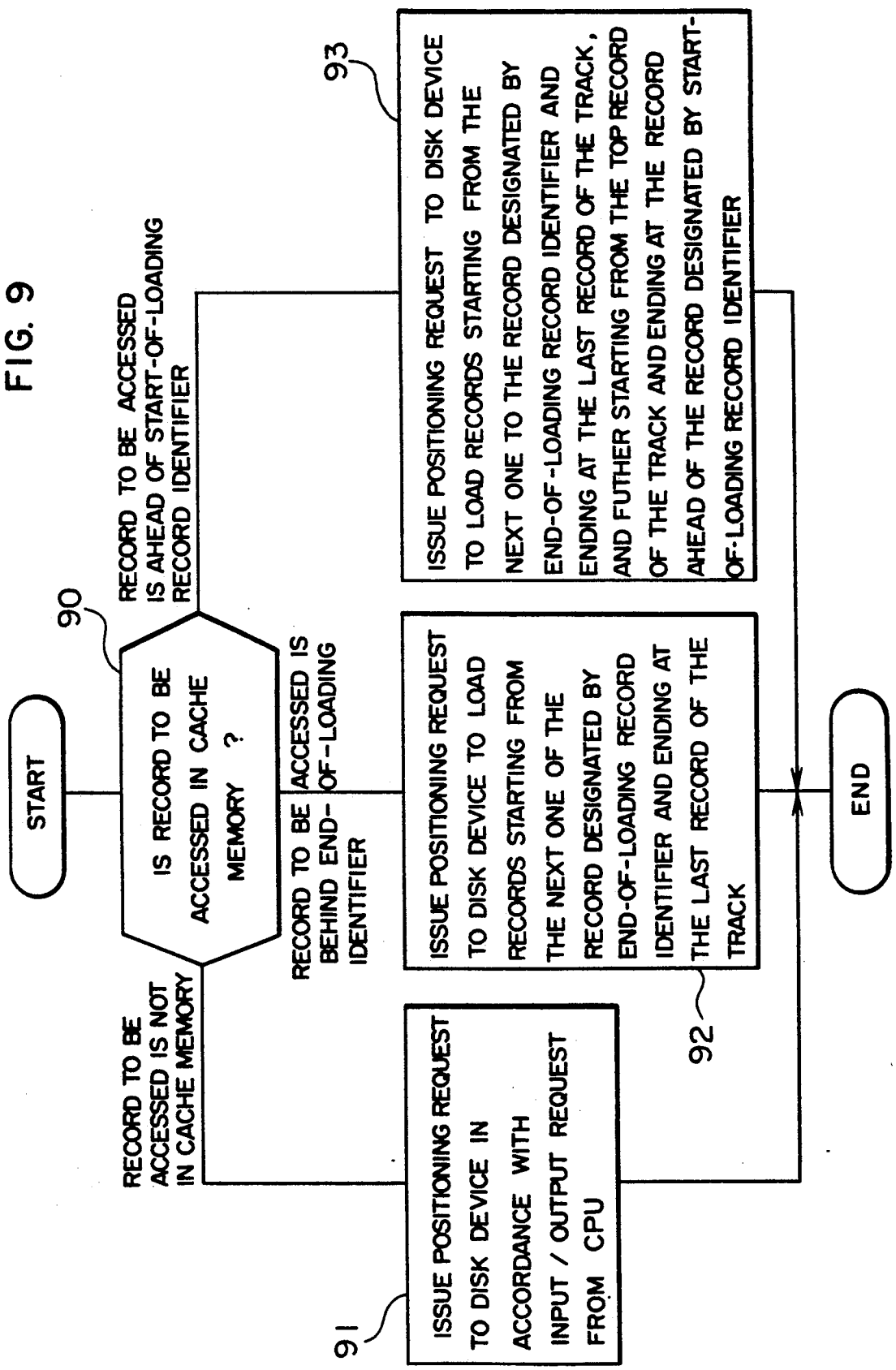
FIG. 9 shows a process flow chart of operations of a processor in one embodiment of the present invention.

FIG. 9 shows a process flow chart of the processor 33. It shows the process to be carried out when the record to be accessed by the input/output request received from the central processing unit 1 does not exist in the cache memory 36. A process relating to one feature of the present invention is described below. In a step 90, a load status of the track which is the object of the input/output request to the cache memory 36 is checked. If the entire track which is the subject of the received input/output request does not exist in the cache memory 36, a positioning request is issued to the disk device 2 in accordance with a positioning request received from the central processing unit 1 (an instruction to the disk device 2 to enable the reading of required data) (step 91). A sufficient number of segments 30 to store one track are allocated.

Next, the processing in the case where a portion of the track which is the subject of the input/output request has been stored in the cache memory 36 is described. If the record to be accessed is behind the records, on the track, stored in the cache memory 36, the following process is carried out. If the record to be accessed is behind the end-of-loading record identifier 56, the positioning request is issued to the disk device 2 in order to load those records which start from the record next to the record designated by the end-of-loading identifier 56 and end with the last record in the track, as shown in a step 92. A sufficient number of segments 30 to store the last record of the track are allocated.

If the record to be accessed is ahead of the records which are present in the cache memory, the following process is carried out. If the record to be accessed is ahead of the end-of-loading record identifier 56, the positioning request is issued to the disk device which start from record the next to the record designated by the end-of-loading identifier 56 and end with the last record of the track and then to load those records which start from the head record of the track and end at the record which is immediately ahead of the record designated by the start-of-loading identifier 55 as shown in a step 93. In this case, if the records of the track have been loaded up to the last record, the loading will be initiated from the head of the track. A sufficient number of segments 30 to perform the loading are allocated.

A process flow of the processor 33 when the completion of positioning is reported from the disk device 2 is now explained with reference to FIGS. 10-12.

First, it is assumed that none of the records in the track to be accessed by the central processing unit 1 exists in the cache memory 36. As shown in a step 94 of FIG. 10, the input/output process is performed in accordance with an input/output request from the central processing unit 1. If a record is read from the disk device 2, it is loaded into the cache memory 36. The record received from the central processing unit 1 for writing into the disk device 2 is written into the disk device 2 and also into the cache memory 36. Then, a start-of-loading record identifier 55 and an end-of-loading record identifier 56 are set. In this case, the records to be accessed from the central processing unit 1 (the records to be written into the disk device 2) are serial records.

Figure 13:
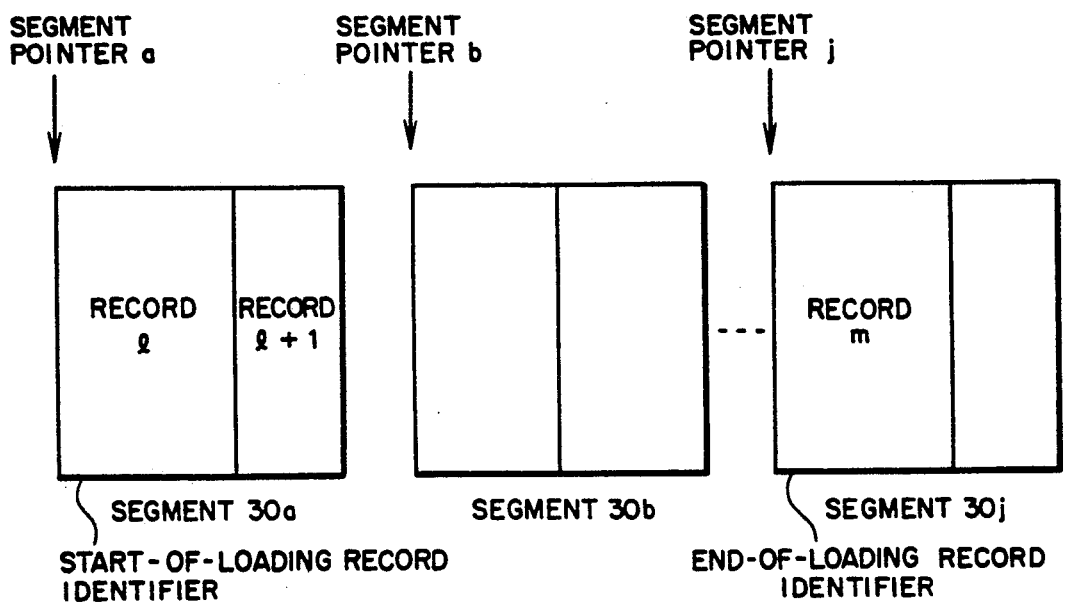
FIGS. 13 to 15 and 17 show data storage formats in the embodiments.

FIG. 13 shows a data storage format for the present case. As shown, the record to be first accessed is loaded at the beginning of the segment 30. Thus, if the number of records to be accessed is small, not only the loading overhead but also the area of the cache memory required can be reduced.

FIG. 11 shows a process flow when an end of positioning request for the process to load those records which starts from the record next to the record designated by the end-of-loading record identifier 56 and end at the last record of the track into the cache memory 36, is received. In this case, as shown in a step 95, those records which start from the record next to the record designated by the end-of-loading identifier 6 and end at the last record are loaded. The end-of-loading record identifier 56 is set to the terminal point of the track.

Figure 14:
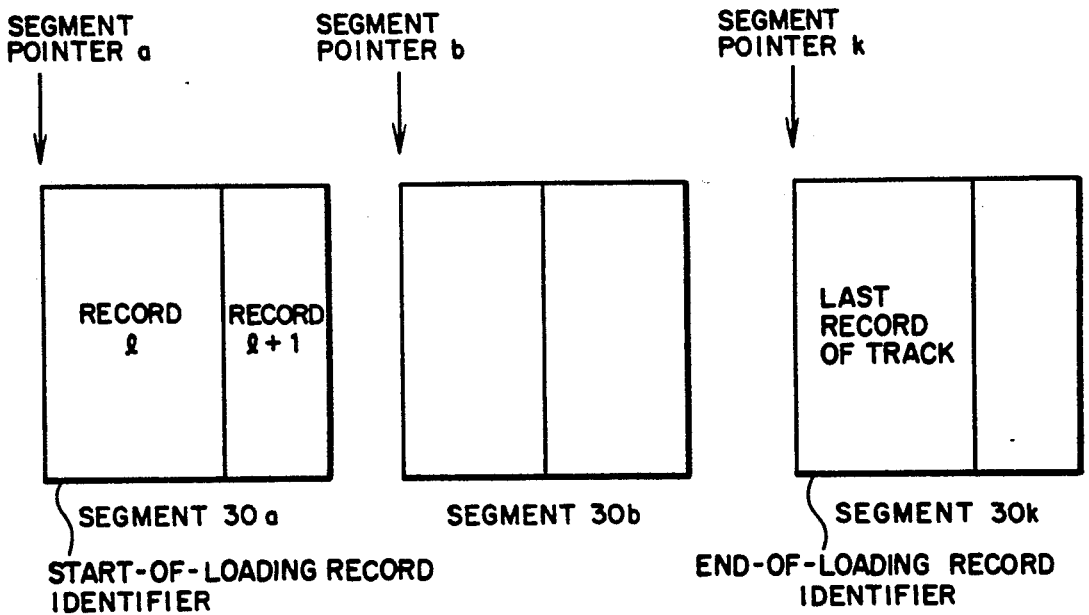

FIG. 14 shows a data storage format for the present case. Thereafter, in a step 96, the reconnection process with the processing unit 1 is executed and the input/output process with the central processing unit 1 is started. The newly loaded records are added after the previously loaded records.

FIG. 12 shows a process when the end of positioning from the disk device 2 is received to load those records which start from the next one to the record designated by the end-of-loading record identifier 56 and end at the lost record of the track into the cache memory 36 and then load those records which starts from the top record of the track and end at the record which is immediately ahead of the record identified by the start-of-loading record identifier 55 into the cache memory 36. This process is performed in a step 97. If the records of the track have been loaded up to the last record, the loading starts from the head record of the track. The end-of-loading record identifier 56 is set to the record which is ahead of the start-of-loading record identifier 55.

Figure 15:
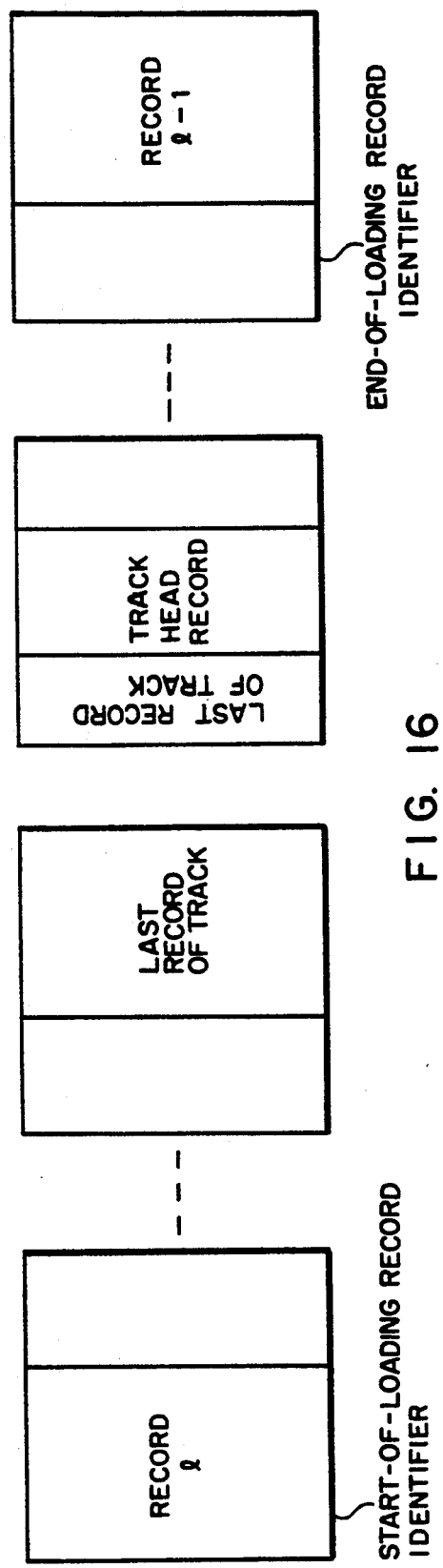

FIG. 15 shows a storage format for the present case. In a step 98, the input/output process with the central processing unit 1 is started. In the loading of a step 97, the records of the track up to the last record of the track are loaded after the records which have been loaded in the cache memory 36, and the records starting from the head record of the track are loaded thereafter.

In the present embodiment, if a record which is behind the records loaded in the cache memory 36 is to be accessed, the records which start from the next one to the records loaded in the cache memory 36 are loaded, as shown in FIG. 11. Alternatively, as shown in FIG. 12, all records other than the records in the track loaded into the cache memory 36 may be loaded into the cache memory 36.

In the above instance a plurality of segments 30 are allocated for loading the track. In this case, memory capacity may be saved compared to a case where the entire track is not loaded into the cache memory 36 and the segments 30 are allocated to the tracks one a one to one basis.

Figure 16:
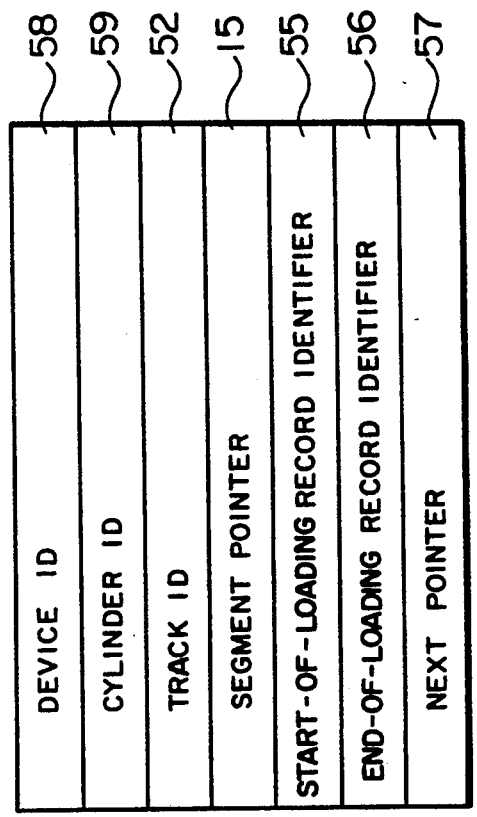
FIG. 16 shows other embodiment of the cache management block.

An embodiment in which one segment 30 is allocated to each track is explained. In this case, the cache management block 40 shown in FIG. 8 is modified to a cache management block 40a shown in FIG. 16, which differs from FIG. 8 in that only one segment pointer 15 is used.

Figure 17:
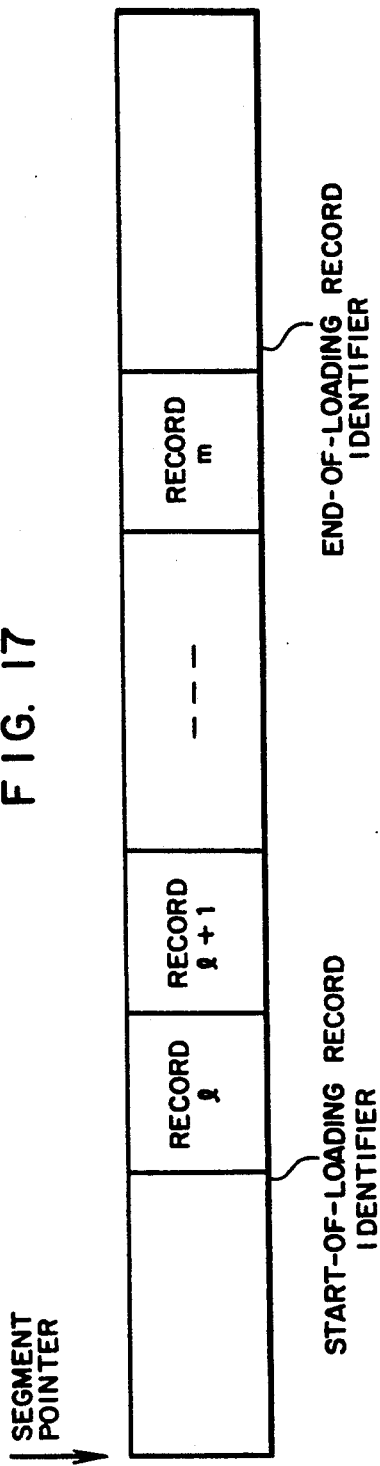

The record which is first accessed from the central processing unit 1 may be loaded at the beginning of the segment 30 as shown in FIG. 13, or the records may be loaded in the segment 30, in the following manner. Namely, as shown in FIG. 17, the load position is determined based on a relative position of the record from the head of the track. In this case, the head record of the track is loaded at the top of the segment 30.

The processor 33 basically operates in the manner shown by the process flows of FIGS. 9–12. However, the segment is allocated only when no records in the accessed track from the central processing unit exist in the cache memory 36, that is, in the step 91 of FIG. 9. Where the storage format shown in FIG. 17 is adopted and a record which is ahead of the record designated by the start-of-loading record identifier 55 is to be accessed, those records which start from the head of the track and end at the record which is immediately preceding the record designated by the start-of-loading record identifier 55 may be loaded. Then the start-of-loading record identifier should be set to the head of the track.

In the present embodiment, one processor 33 is provided in the controller 3. Alternatively, a plurality of processors 33 may be provided, and a plurality of input/output paths from the central processing unit 1 and the disk device 2 may be provided. Further, the data transfer between the central processing unit 1 and the cache memory 36 and the data transfer between the disk device 2 and the cache memory 36 may be performed in parallel. In essence, the cache memory 36 is in the controller 3 in the present embodiment and no other component is essential.

In accordance with the present embodiment, the records to be loaded into the cache memory are determined based on the presence or absence, in the cache memory, of the record in the track to be accessed by the input/output request from the central processing unit. Thus, even if the record of the track is of variable length, the data loading method which permits the reduction of the loading overhead by the management on a track basis is attained.

Another embodiment to reduce the loading overhead to the cache memory and improve the hit rate will be explained.

Figure 18:
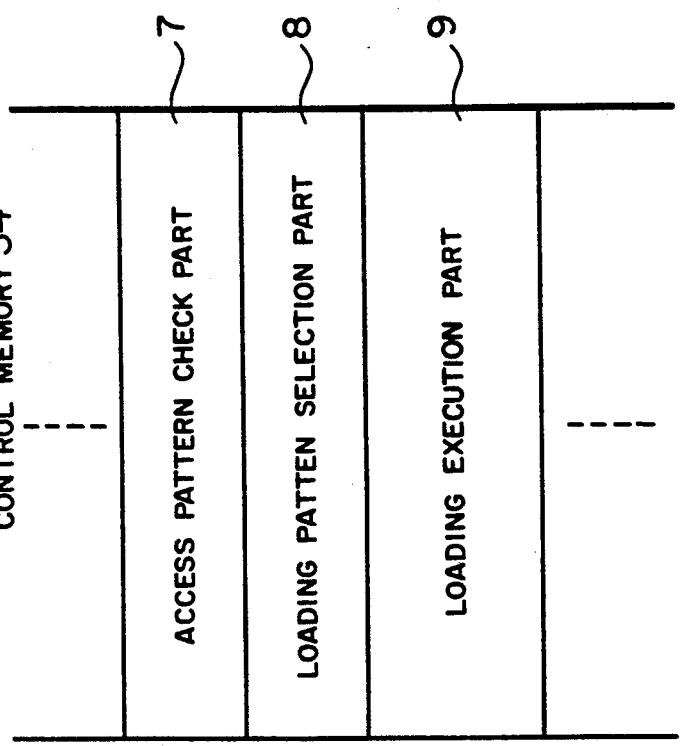
FIG. 18 shows a structure of a program for conducting major functions of the present invention.

FIG. 18 shows a configuration of a control memory 34. The control memory 34 stores therein modules for carrying out the functions of the processor 33. Only those portions which are pertinent to the present embodiment are explained below. An access pattern check part 7 checks the access pattern of the input/output request and stores information concerning the access pattern. A loading pattern selection part 8 determines a loading pattern in accordance with the information collected by the access pattern check part. A loading execution part executes and controls the loading in accordance with the loading pattern selected by the loading pattern selection part 8.

Figure 19:
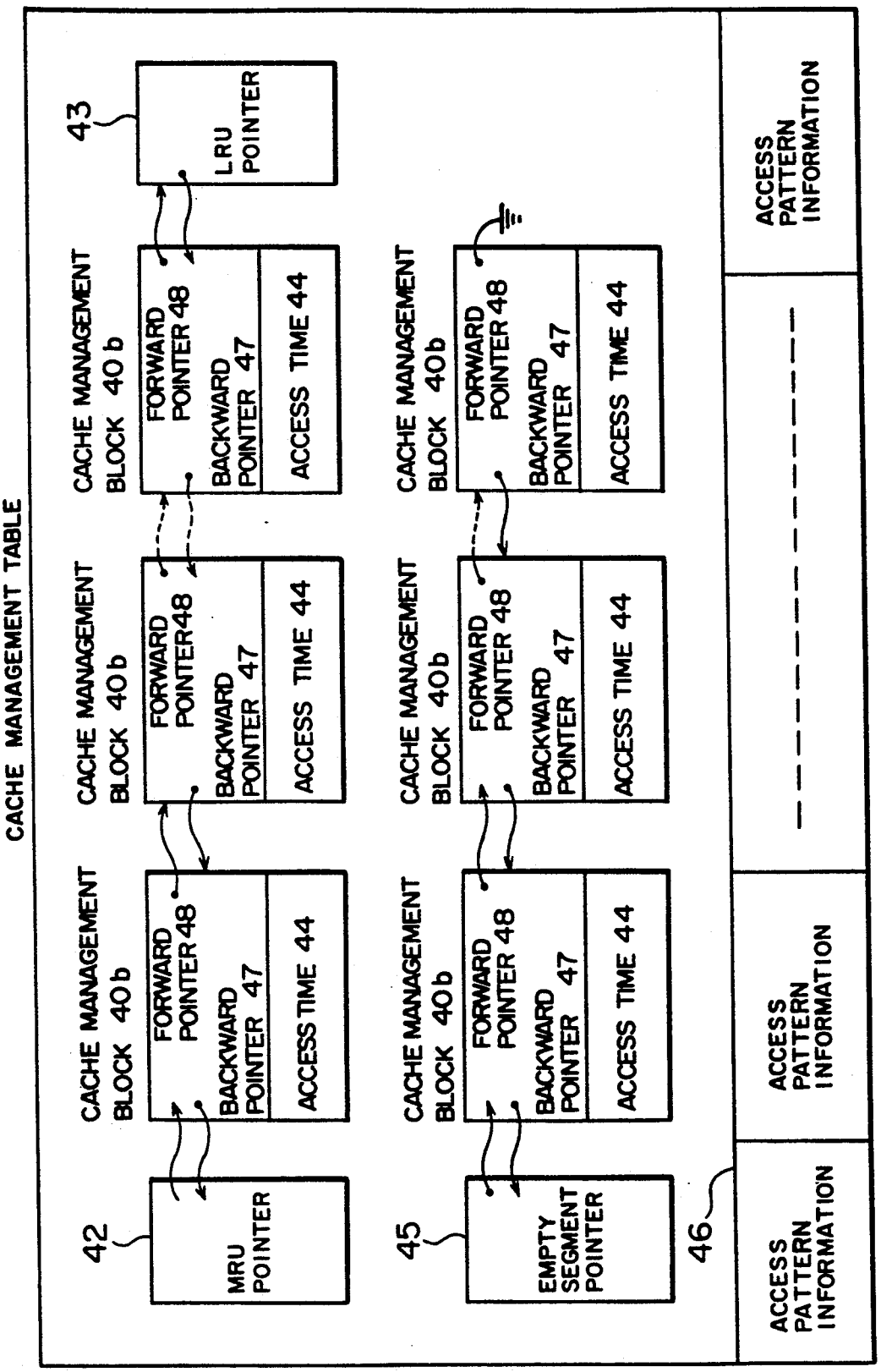
FIG. 19 shows a structure of the cache management table.

FIG. 19 shows a further configuration of the cache management table 4. Only those portions of the cache management table 10 which are pertinent to the present embodiment are explained below, cache management blocks 40b are provided one for each of the tracks to which one or more segments 30 in the cache memory 36 have been allocated (that is, a portion of the track has been loaded into the cache memory 36). The cache management blocks 40b are chained in the order of MRU (most recently used) by a forward pointer 48 and a backward pointer 47. An MRU pointer 42 points to the cache management block 40b of the track which has most recently been accessed for input/output process. An LRU (least recently used) pointer 43 points to the cache management block 40b of the track which has not been accessed for the input/output process for the longest period among the tracks loaded in the cache memory 36. Accordingly if a miss occurs (that is, the data to be accessed does not exist in the cache memory 36) and a new segment 30 is to be allocated and there is no empty segment, the segment 30 which stores therein the track corresponding to the cache management block 40b pointed to by the LRU pointer 43 and the cache management block 40b are released. An access time 44 contains therein a time of most recent input/output access to the track corresponding to the cache management block 40b. (Accordingly, if it is followed from the MRU pointer 42 to the forward pointer 48, the access time 44 in the cache management block 40b decreases.) If there are empty cache management blocks 40b which have not been allocated to tracks, the leading cache management block 40b is pointed to by the empty block pointer 45, and each cache management block 40b is pointed to by the forward pointer 48 and the backward pointer 47.

Access pattern information 46 contains therein information which the access pattern check part 7 has collected on the access patterns of the input/output requests for each cache management, that is, for each track in the present embodiment. In the present embodiment, the access pattern information 46 is provided for all tracks of the disk device 2. Alternatively, a portion of the information may be provided in the cache management block 40b to reduce required capacity of the memory.

FIG. 20 shows a configuration of the access pattern information 46. In the present embodiment, whether the accepted input/output request is sequential access or not is checked. If it is a sequential access, a plurality of tracks which may be later accessed are loaded. This is hereinafter referred to as multi-track loading.

If the input/output request is not a sequential access, the records which have actually been accessed by the central processing unit 1 during the time period between the partial or full loading into the cache memory 36 in the non-existence status of the data on the track in the cache memory 36 and the purging of the entire data of the track from the cache memory 36, are recognized, and the loading method is selected in accordance with the recognition.

The information necessary to determine the sequential access is explained below. A sequential check flag 100 indicates that whether the data in the track is sequentially accessed or not is being checked. Specifically, when the head record of the track corresponding to the access pattern information is accessed, the flag is set. If the access to the records following the head record is not made sequentially or the sequential access is made until the last record of the track is reached (that is, when the sequential accessing to the track is detected), the flag is reset. A sequential check address 101 indicates the position from the top of the track at which the record to be accessed in the next sequential access is stored. A sequential recognition flag 102 is set when the sequential access has been made up to the last record of the track. It is reset when an input/output request to the track is next accepted.

For accesses other than a sequential access, the loading method is determined based on the concept that the portions to be loaded are those accessed by the central processing unit 1 in the period from the time point at which any record on the track to be accessed is not present in the cache memory 36 when the input/output request is accepted (this case is referred to as track miss.) to the time point at which all the records on the track are purged from the cache memory 36.

Figure 21:
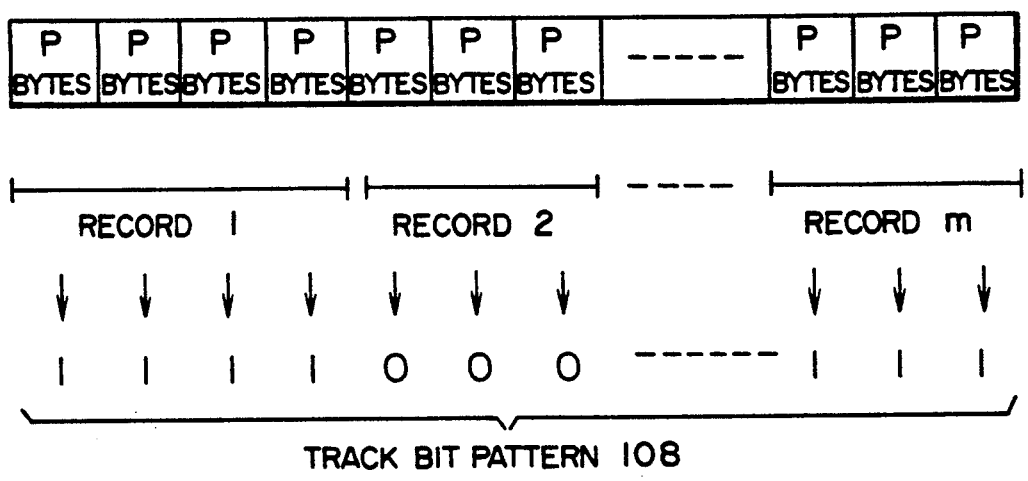
FIG. 21 shows a method for recognizing the accessed part by a CPU in the track.

The information for recognizing the part (the area) which the central processing unit 1 has actually accessed in the track is described below. In one manner, one bit is assigned to each fixed length of data (p bytes in FIG. 21) and the track is represented by a plural-bit track bit pattern 108 as shown in FIG. 21. When one record is accessed, the bit corresponding to the track area in which the record is stored is set. (In FIG. 21, the records 1 and m have been accessed, and the record 2 has not been accessed.) Only those areas whose corresponding bits have been set are loaded into the cache memory 36. If the entire track is not loaded in the case of a track miss and that track is to be subsequently accessed, a portion of data of the track may be in the cache memory 36 while the record to be accessed may not be in the cache memory 36. In this case, the record to be accessed is newly loaded into the cache memory 36. Since the disk device 2 is a rotating device, the loading time is not shortened if there are gaps between the "on" bits. In the present embodiment, the area which the central processing unit 1 has accessed is recognized in a manner shown in FIG. 22.

Figure 22:
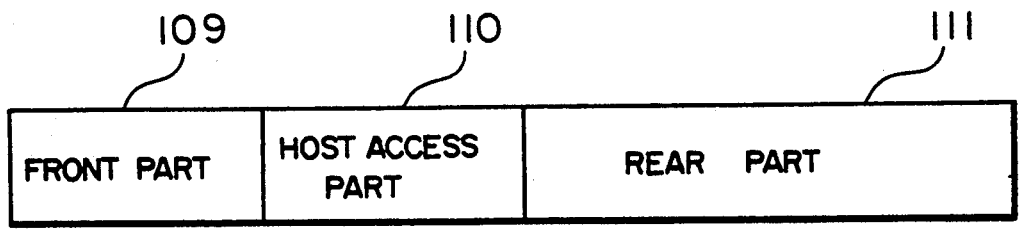
FIG. 22 shows another method for recognizing the accessed part by the CPU.

In FIG. 22, the track is divided into a host access part 110, a front part 109 and a rear part 111. The host access part 110 comprises the records accessed by the central processing unit 1 when a track miss had taken place for the input/output request to the track. The front part 109 comprises the records which are ahead of the host access part 110, and the rear access part 111 comprises the records which are behind the host access part 110.

In the present embodiment, it is assumed that the following loading patterns are provided for the track miss for the accesses other than the sequential access. (The present invention is effective when any other loading pattern is provided)

(a) Track loading—load the entire track (b) Host access part + rear part loading—load the host access part and the rear part (c) Host access part loading—load only the host access With the above loading patterns, if the host access part + rear part loading (b) is executed to load the records into the cache memory 36 and an access is made to a record in the front part 109 of the track, a miss takes place. This is called a front miss.

When the host access part loading (c) is executed, a miss takes place if a record in the rear part 111 is accessed. This is called a rear miss. The process for the front miss or the rear miss is explained below.

(1) Front miss: All records in the track which have not been loaded in the cache memory 36 are loaded into the cache memory 36.

(2) Rear miss: Only the records in the rear part 111 are loaded into the cache memory 36.

In the above loading method, the area of the host access part 110, the front access part 109 and the rear access part 111 which the central accessing unit 1 has actually accessed during the time period from the occurrence of the track miss to the purge of the entire track from the cache memory 36, is recognized and stored. The statistical information on the accessed area is logged, and an appropriate loading method is selected when the track miss takes place. In the present embodiment, the most frequent loading pattern in the past q accesses is selected.

For example, if the access to the rear part 111 is most frequent, the host access part + rear part loading (b) is selected.

The information which should be present in the access pattern information 46 as the information to be acquired in order to attain the above method is explained below.

Start/end addresses 103 indicate start/end addresses on the track of the host access part which the central processing unit 1 has accessed at the track miss.

A front part access flag 104 and a rear part access flag 105 indicate whether the central processing unit 1 has accessed to the front part 109 and the rear part 111, respectively, after the track miss. An access part check flag 106 indicates that whether the front part 109 and the rear part 111 area accessed or not is under check.

The statistical information 107 indicates whether the front part or the rear part has been accessed during the period from the occurrence of the track miss to the purge of the entire track from the cache memory 36, that is, it is an accumulation of the past r times of information of the front part access flag 104 and the rear part access flag 105.

In order to save the storage capacity, the statistical information 107 may be logged in a larger unit than by track, for example, by cylinder.

A process flow of the access pattern check unit 7 and the loading selection unit 8 is explained below. Since the loading execution unit 9 carries out the loading in accordance with the instruction from the loading selection unit 8, a process flow of the loading execution unit 9 is not shown.

The process flow of the access pattern check unit 7 is first explained. The access pattern check unit 7 recognizes the sequential access pattern and other access pattern. The recognition of the sequential access is first described.

Figure 23:
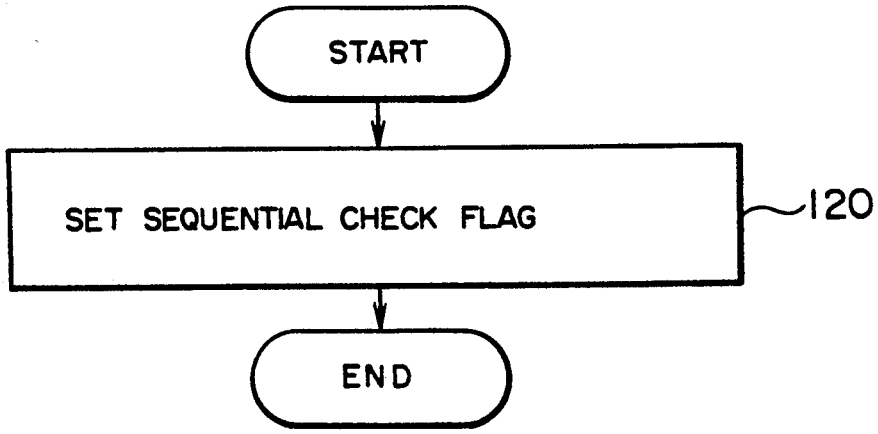
FIG. 23 shows a process flow chart of operations to be carried out when a head record of the track is accessed.

FIG. 23 shows a process when the head record of the track is accessed. In a step 120, the sequential check flag 100 corresponding to the accessed track is set and the process is terminated.

Figure 24:
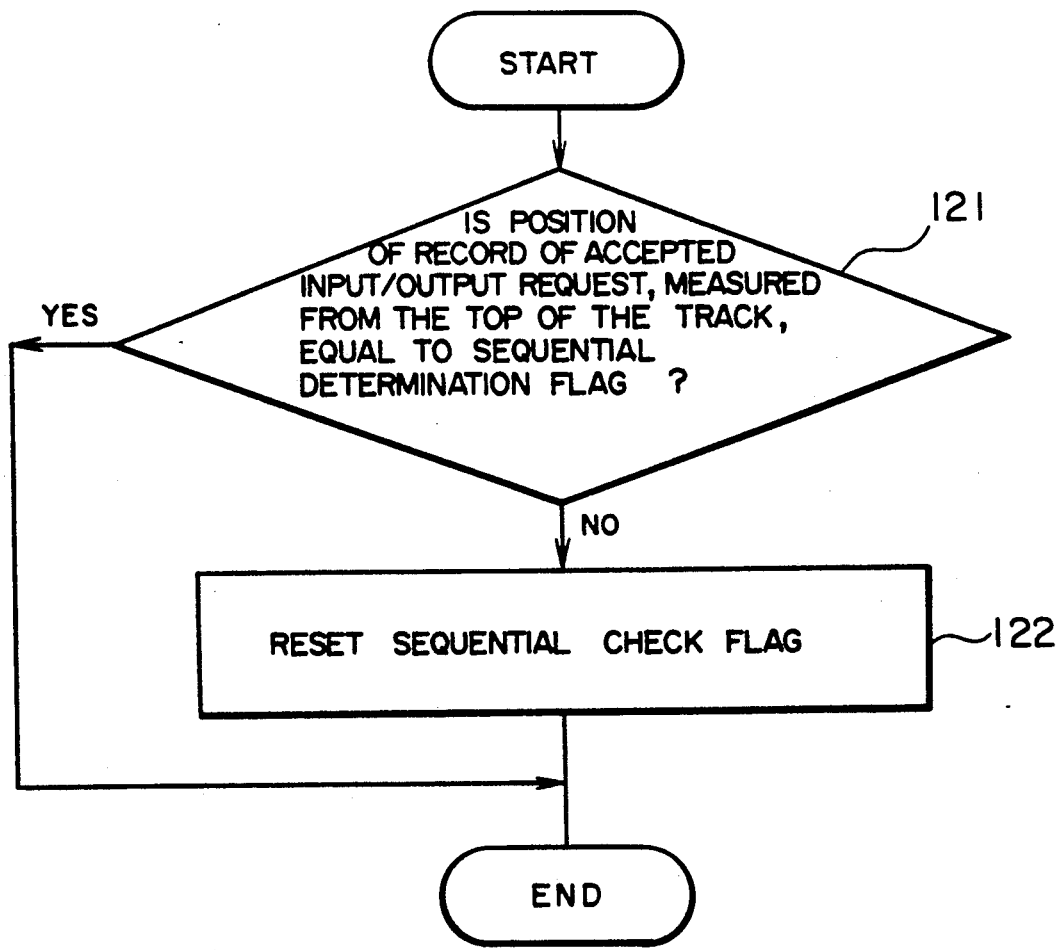

FIG. 24 shows a process which is executed if the sequential check flag 50 corresponding to the accessed track is "on" when the process for the input/output request has been accepted. In a step 121, whether the position of the record to be accessed in response to the accepted input/output request, measured from the head of the record, is equal to the sequential determination address 101 corresponding to the accessed track is checked. If they are equal, it means that the records are sequentially accessed and no specific step is performed. If they are not equal, the sequential check flag 100 is reset (off) in a step 122.

Figure 25:
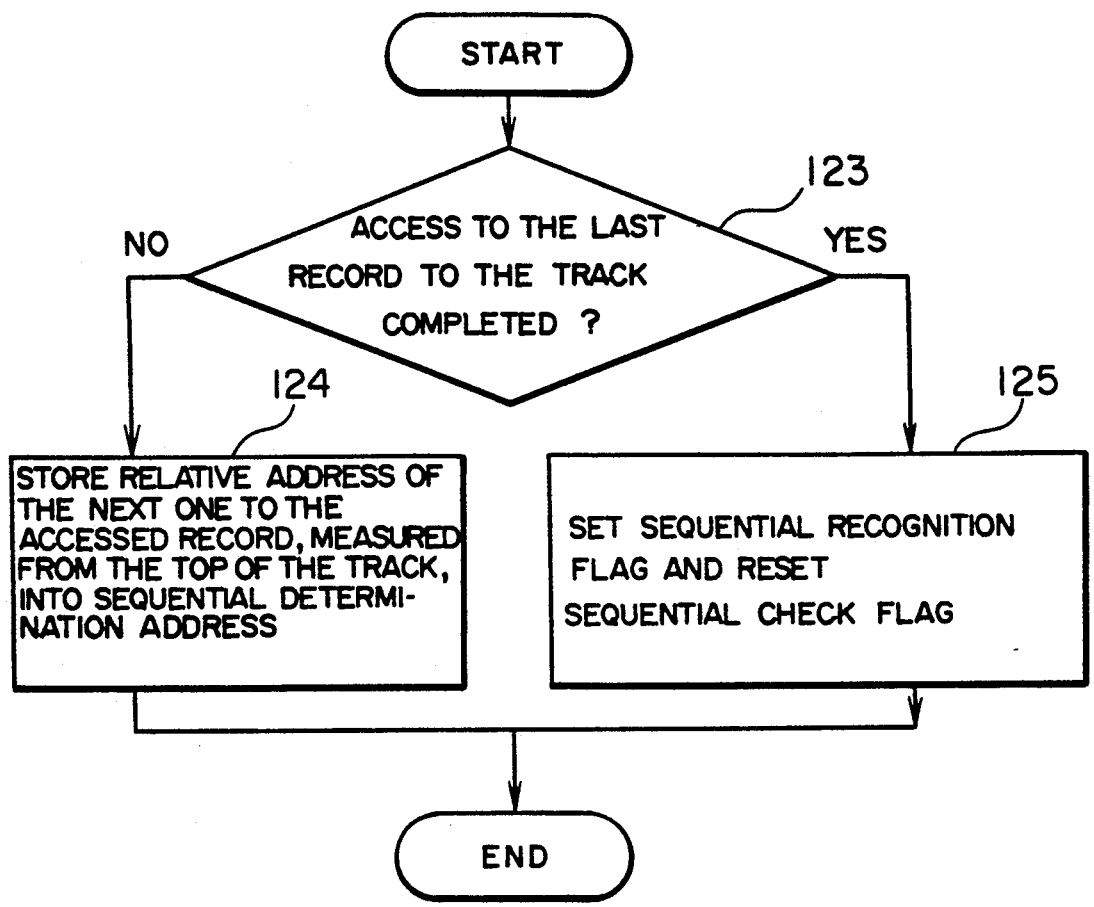
FIG. 25 shows a process flow chart of operations to be carried out when the sequential check flag of the track is ON at the end of the processing to the input-/output request.

FIG. 25 shows a process which is executed if the sequential check flag 100 corresponding to the accessed track is "on" at the end of the process for the input/output request. In a step 123, whether the input/output process has been completed up to the last record of the track is checked. If it has not been completed, a relative address of the next record to the record for which the input/output process has been completed, measured from the head of the track, is recorded in the sequential determination address 101 corresponding to the accessed track in a step 124.

If it has been completed, it means that the records of the track have been sequentially accessed, and the sequential recognition flag 102 corresponding to the accessed track is set (on) and the sequential check flag 101 is reset (off) in a step 125.

Figure 26:
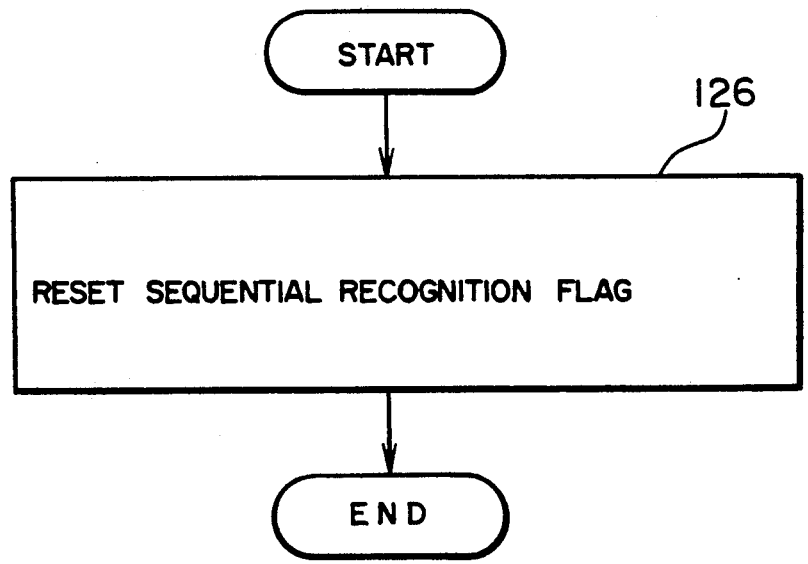
FIG. 26 shows a process flow chart of operations to be carried out when a sequential recognition flag of the track is ON upon acceptance of the input/output request.

FIG. 26 shows a process which is executed if the sequential recognition flag 102 corresponding to the accessed track is "on" when the input/output request has been accepted. In this case, the sequential recognition flag 102 corresponding to the accessed track is reset (off) in a step 126.

A process for the access which has been recognized as non-sequential access is explained below.

Figure 27:
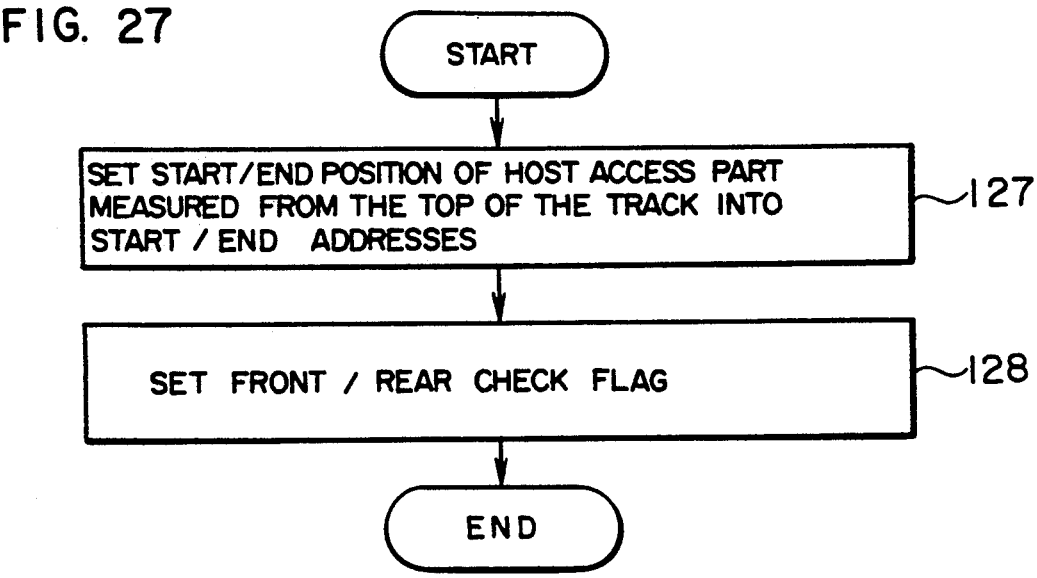
FIG. 27 shows a process flow chart of operations to be carried out after the loading other than multi-track loading has been conducted when tracking miss occurred.

FIG. 27 shows a process which is executed after a loading other than the multi-track loading when a track miss takes place. (The multi-track loading is performed when the sequential access is recognized.)

In a step 127, the start/end positions, measured from the head of the track, of the records in the track which the central processing unit 1 has actually accessed in response to the input/output request, that is, the host access part 110 shown in FIG. 22, are set into the start/end address 103 corresponding to the accessed track. In a step 128, the access unit check flag 106 corresponding to the accessed track is set (on).

Figure 28:
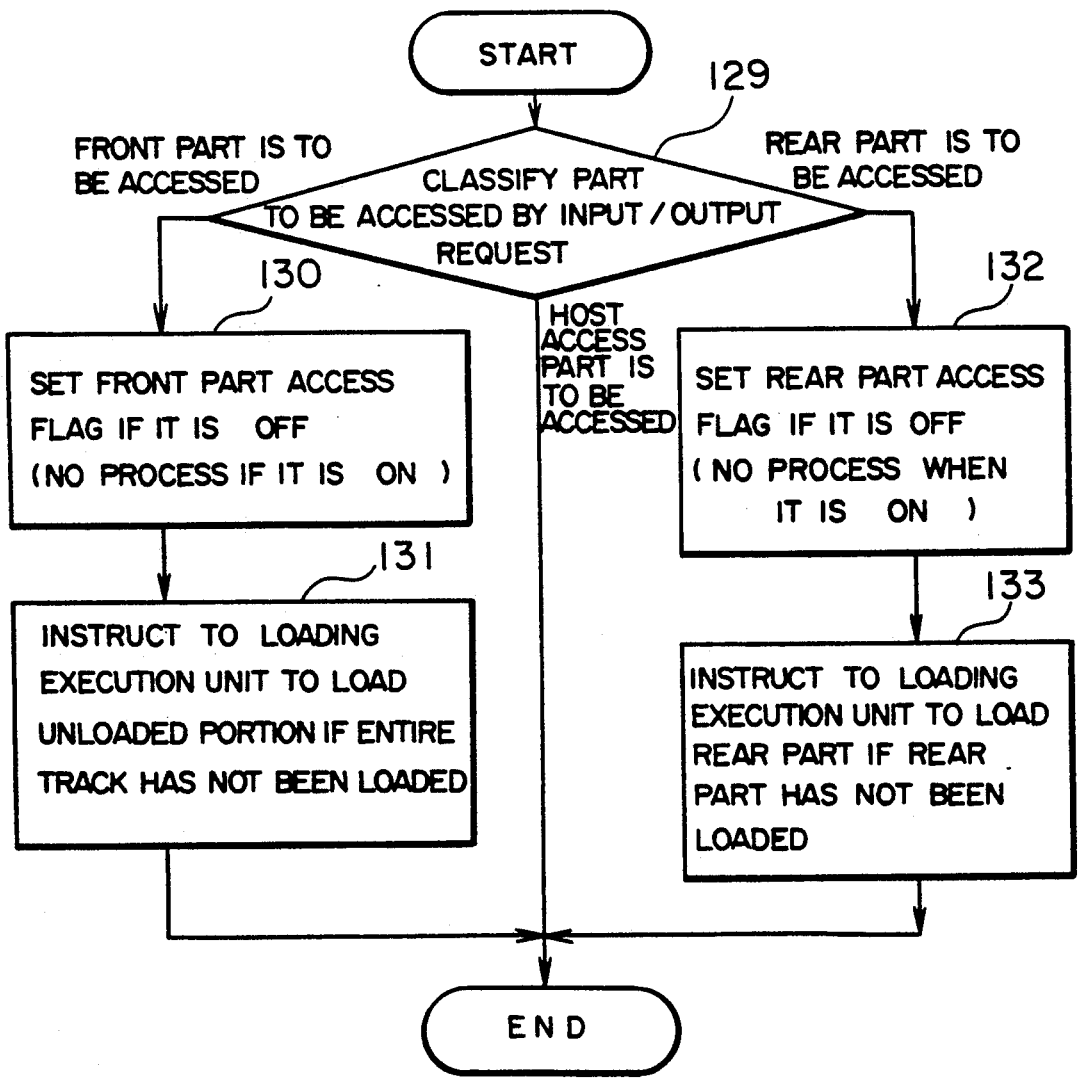

FIG. 28 shows a process which is executed if the input/output request to the track is received when the access unit check flag 106 is "on". In a step 129, which position of the front part 109, the host access part 110 and the rear part 111 shown in FIG. 22 the record to be accessed by the accepted input/output request corresponds to is analyzed.

If the host access part 110 is to be accessed, no step is performed and the process is terminated.

If the front part 109 is to be accessed and the front part access flag 104 corresponding to the accessed track is "off" in a step 130, it is set (on). No step is performed if it has been "on". In a step 131, if the entire track has not been loaded in the cache memory 36, an instruction is issued to the loading execution unit 9 to load the unloaded portion If the rear part 111 is to be accessed, the rear part access flag is set (on) in a step 132 if is "off". (No step is performed if it has been "on".) In a step 133, an instruction is issued to the loading execution unit 9 to load rear part 111 into the cache memory 36 if the rear part does not exist in the cache memory 36.

Figure 29:
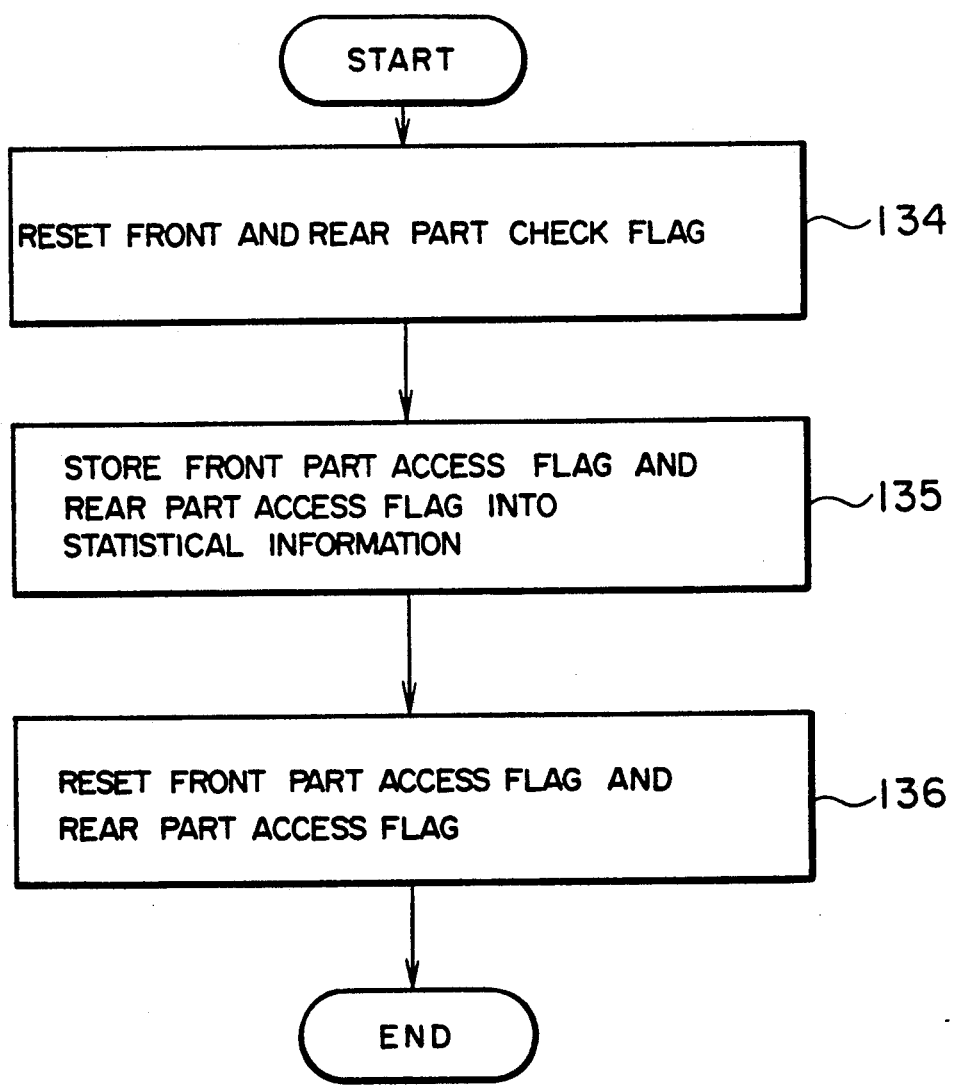
FIG. 29 shows a process flow chart of operations to be carried out when the access check flag is ON and the track is to be purged from the cache memory.

FIG. 29 shows a process which is performed if the access check flag 106 corresponding to the accessed track is "on" when the track is to be purged from the cache memory 36.

In a step 134, the access unit check flag 106 is reset (off). In a step 135, the oldest contents of the current front part access flag 104 and the rear part access flag 105 of r times of the contents of the ones (the front access part flag 104 and the rear part access flag 105) in the statistical information 107 is deleted, and then the current of the front part access flag 104 and the rear part access flag 105 is stored into the statistical information 107. In a step 136, the front part access flag 104 and the rear part access flag 105 are reset (off).

Figure 30:
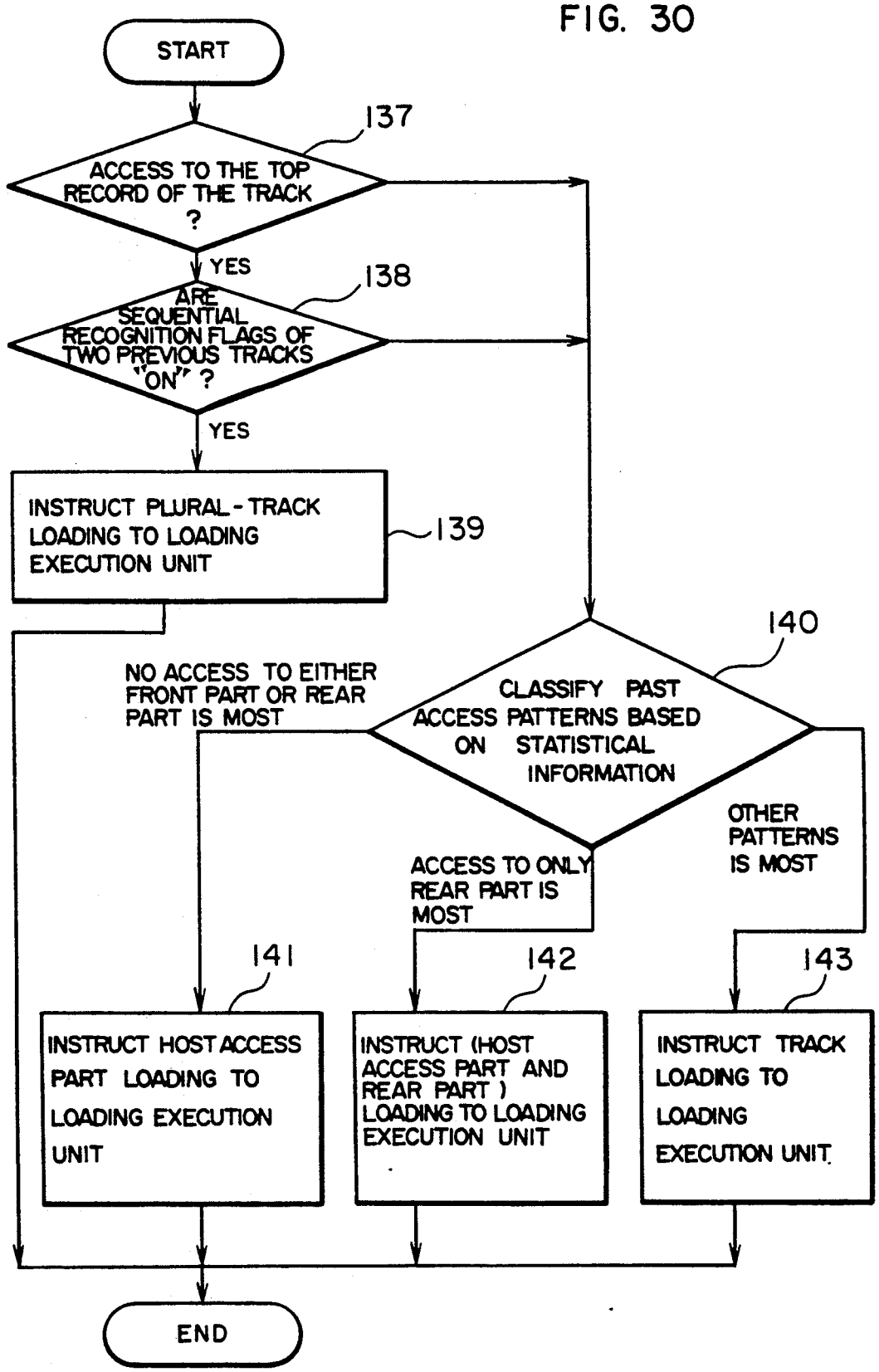
FIG. 30 shows a process flow chart of loading selection.

A process flow of the loading selection unit 9 is explained with reference to FIG. 30, which is executed when the track miss takes place.

In a step 137, whether the input/output request is to the head record of the track or not is checked. If it is not, the process jumps to a step 140. If it is the access to the head record, it is determined whether the sequential recognition flag 102 of the two track access pattern information 46 which are ahead of the track to be accessed is "on" or not in a step 138. Although two tracks are checked in the present embodiment, the present invention is effective whether other than two tracks are checked. If it is not "on", the process jumps to the step 140.

If it is "on", it means that the access is the sequential access and an instruction is issued to the loading execution unit 9 to load a plurality of tracks in a step 139, and the process is terminated.

The process starting from a step 140 is one for selecting a loading method when the access is determined as non-sequential access. In the step 140, the past q times ($q \leq r$) of access patterns are classified into patterns in the statistical information 107 corresponding to the accessed track which have not been accessed either to the front part 109 or to the rear part 111, the patterns which have been accessed to only the rear part 111 and the patterns other than the above two patterns. If the patterns which have not been accessed either to the front part or the rear part are greatest, the host access part loading is instructed to the loading execution unit in a step 141.

If the patterns which have been accessed to only the rear part 111, the host access part+rear part loading is instructed to the loading execution unit 9 in a step 142.

If the other patterns are greatest, the track loading is instructed to the loading execution unit 9 in a step 143.

In the present embodiment only the statistical information 107 corresponding to the accessed track is referred in selecting the loading, although the statistical information 107 of other than that track may be referred to.

In the present embodiment, in order to check whether the records in the track are sequentially accessed or not to recognize the sequential access, only one sequential identification flag 101 is provided. Thus, if a relatively high frequency process of sequentially updating the sequentially read records is to be performed, it is impossible to recognize the sequential access correctly. This problem is solved by recognizing the read sequential process and the write sequential process. In this case, the access pattern information 46 is configured as shown in FIG. 31 instead of FIG. 20. The difference from FIG. 20 lies in that the sequential check flag 100, the sequential identification address 101 and the sequential recognition flag 102 of FIG. 20 are provided for reading and writing, respectively. Which information is to be handled is determined depending on whether the accepted input/output request is the read request or the write request. The timing and method of the operation are similar to those of the above embodiment.

In recognizing the sequential access, the condition that the position of the record, from the head of the track, to be accessed by the accepted input/output request is identical to the sequential identification address 101 is checked. Alternatively, the sequential access may be recognized even if there is a certain difference between the position of the accessed record and sequential identification address 101.

The loading pattern when the track miss takes place for the access other than the sequential access include three patterns, that is, the host access part loading (host access part+rear part), the loading and the track loading in the above embodiment. A pattern without loading may be added to those three patterns. It is effective when no access is made to the track during the period from the loading at the track miss to the purge of the entire track from the cache memory 36.

In this case, it is necessary to monitor not only the access to the front part 109 and the rear part 111, but also the access to the host access part 110 after the loading a the track miss.

When the pattern without loading is executed, the following recognition should be done. When the track miss takes place, whether the track miss has taken place because the loading was not done when the previous track miss had taken place or the track miss has taken place because the interval of the access to the track is too long although the loading was done should be distinguished. In the former case, there was no need for loading. In the latter case, however, if the current access is to the host access part 110, the host access part loading should have been done at the previous track miss. Similarly, if the access is to the rear part 111, the (host access part+rear part) loading should have been done. If the access is to the front part 109, the track loading should have been done. Accordingly, the loading method which should have been selected at the previous track miss is stored in the statistical information 107 so that it is reflected in the subsequent selection of the loading method. If it is recognized that no loading has to be done at the previous track miss, the fact that none of the host access part 110, the front part 109 and the rear part 111 has been accessed is stored in the statistical information 107. If it is recognized that any loading should have been done at the previous track miss, the fact of the access to the host access part 110 if the access is to the host access part 110, the fact of the access to the rear part 111 if the access is to the rear part 111 and the fact of the access to the front part 109 if the access is to the front part 109, are stored in the statistical information 107.

In order to determine if any loading should have been done at the previous loading, the time of occurrence of the track miss is stored in the access pattern information 46a. When a track miss takes place next time, the access time 44 in the cache management block 40b pointed by the LRU pointer 43 is compared with the occurrence time. If the purge method of the cache memory 36 is the LRU method and the occurrence time is later than the access time, the record would have been purged from the cache memory 36 even if the loading was done at the previous track miss. Otherwise, the record is still present in the cache memory 36 and the loading should have been done.

Figure 32:
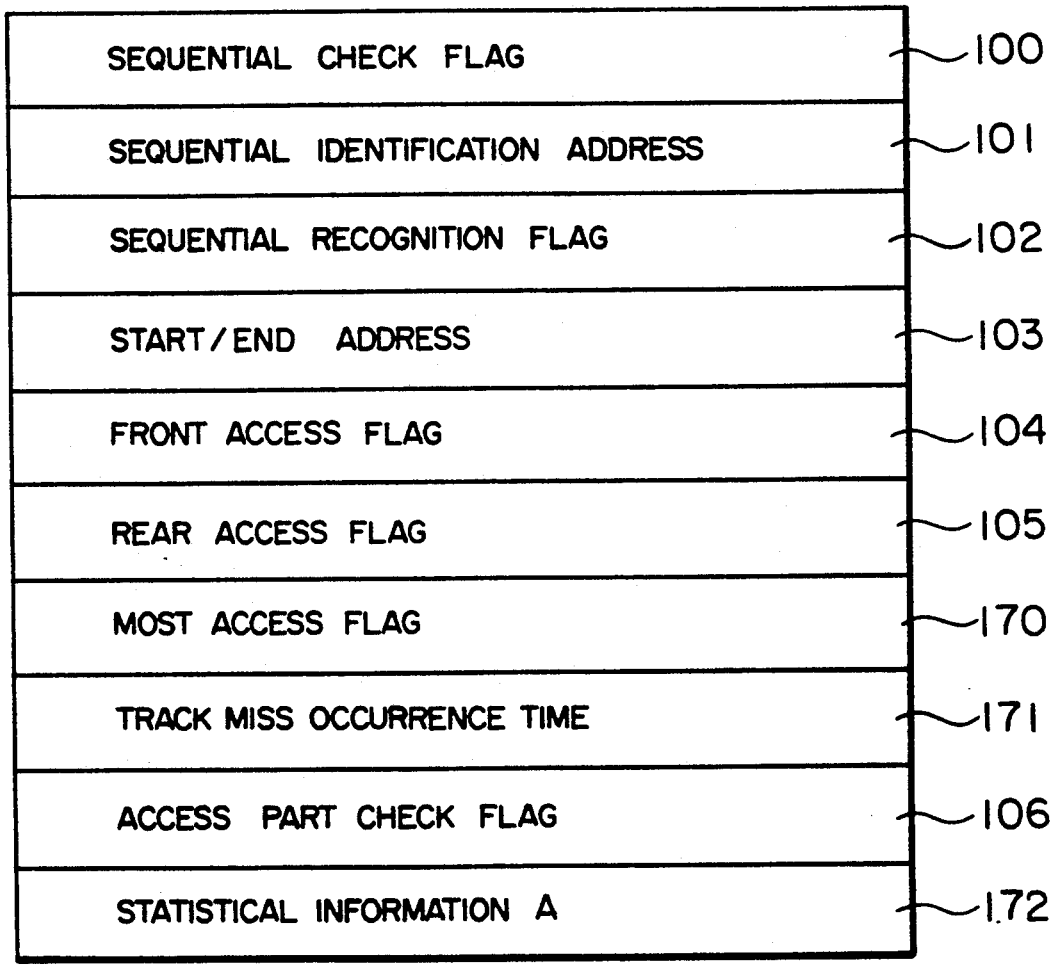
FIG. 32 shows a structure of access characteristic information when a pattern without loading is prepared.

FIG. 32 shows a configuration of the access pattern information 46b when the pattern without loading is provided. Similarly, FIG. 33 shows a configuration 46c when the pattern without loading is applied to the access pattern information 46a of FIG. 31.

The newly provided information is explained. A host access flag 170 is used to check the access to the host access part 110. A track miss occurrence time 171 is provided to store the track miss occurrence time. The purpose to use the host access flag 170 and the track miss occurrence time 171 has been described above.

The statistical information A172 differs from the statistical information 107 in that the statistical information 107 is the past information of the front access flag 104 and the rear access flag 105 and the statistical information A172 additionally includes the past information of the host access flag 170. The relationship between the statistical information A172 and the loading method to be selected at the track miss is described below.

(a) When the patterns which are to be accessed to none of the host access part 110, the front part 109 and the rear part 111 are most, no loading is done.

(b) When the patterns which are to be accessed only to the host access part 110 is most, the host access part loading is done.

(c) When the patterns which are to be accessed only to the host access part 110+rear part 111 are most, the (host access part 110+rear part 111) loading is done.

(d) In other cases than the above three cases, the track loading is done.

The basic concept for the provision of the pattern without loading, the purpose of using the newly provided information and the manner to select the loading method at the track miss have been described. The process flow is of no much difference from that when no such pattern is provided, and hence the explanation thereof is omitted.

Figure 34:
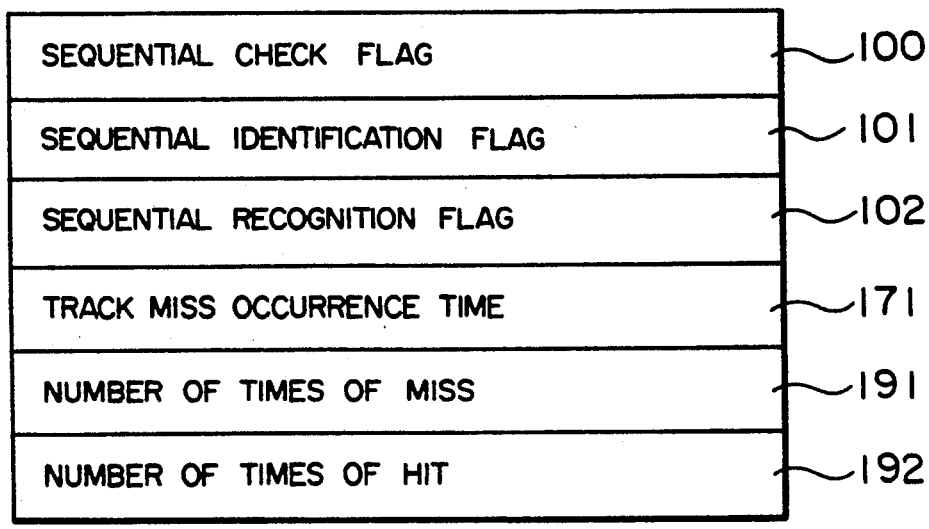
FIG. 34 shows a structure of access characteristic information when an approximate of a hit rate is to be grasped.
Figure 35:
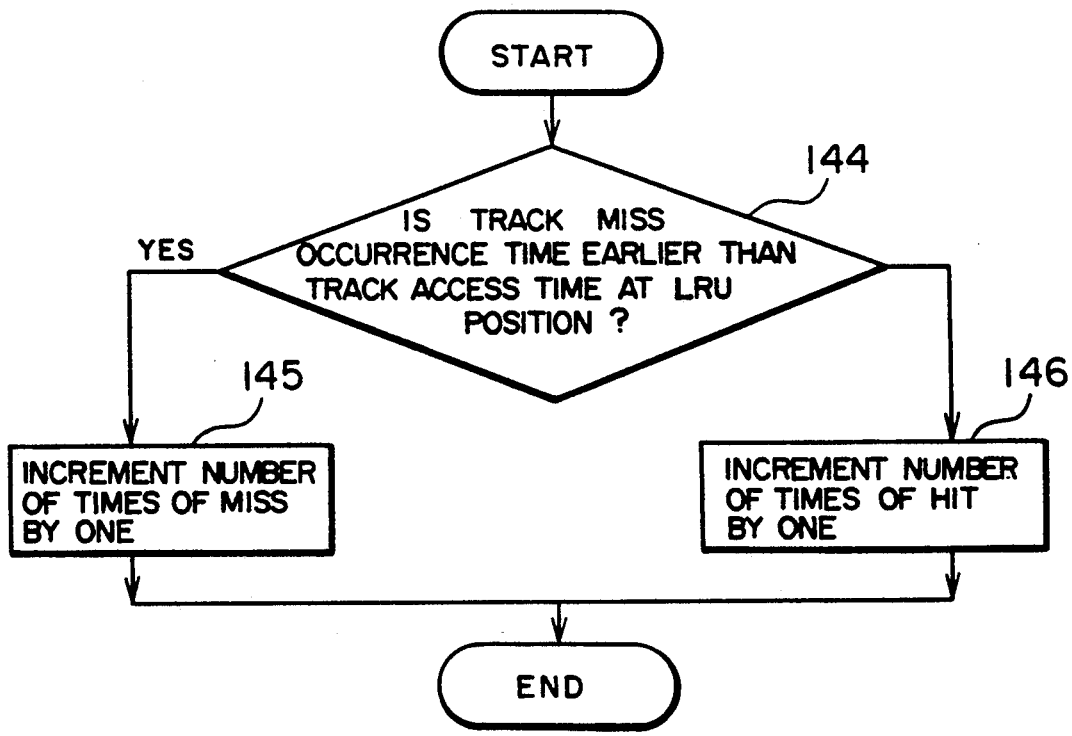
FIG. 35 shows a process flow chart which indicates when the approximate of the hit rate is to be grasped.

In the above embodiment, the area in the track to be accessed by the central processing unit 1 is grasped as the access pattern to the access other than the sequential access. Other factor may be a track hit rate (a rate of presence of the record to be accessed in the cache memory 36). If the hit rate is lower than a predetermined value, the track may not be loaded into the cache memory 36. However, there may be a case where the loading is preferable because the access pattern has been changed after the decision of non-loading. The hit rate may be measured if the track is to be loaded but it is difficult to measure the hit rate if the track is not to be loaded. Thus, an approximation of the hit rate is grasped by some information when the track is not to be loaded. FIG. 34 shows a data structure of access pattern information 46c, and FIG. 35 shows a process flow. FIG. 34 corresponding to FIG. 31 is omitted.) The record other than the sequential access is discussed. The track miss occurrence time 171 is identical to the track miss occurrence time 171 of FIG. 32. The time at which a decision was made not to load the track into the cache memory although the track miss has taken place is stored therein. How to use a number of times of miss 191 and a number of times of hit 192 is explained with reference to the process flow of FIG. 35. In the process shown in FIG. 35 is executed during that period when the track is not loaded into the cache memory 36. Therefore, all input/output requests cause track miss. In a step 144, if the track is to be accessed, the track miss occurrence time 171 and the access time 44 in the cache management block 40b pointed by the LRU pointer 43 are compared. If the track miss occurrence time 171 is earlier, the track miss would have taken place even if the loading would have been done at the previous track miss. Thus, the number of times of miss 192 of FIG. 34 is incremented by one in a step 145. Otherwise, number the hit function 192 is incremented in a step 146 and the track miss occurrence time is updated. If the sum of the hit function 192 and the number of times of miss 192 exceeds a certain value and the hit rate [hit function 1921 (hit function 191+number of times of miss 192] exceeds a certain value, the loading of the track into the cache memory may again be permitted.

In accordance with the present invention, the reduction of the loading overhead to the disk cache and the improvement of the hit rate are attained in balance.

We claim:

1. A method for controlling a cache memory by a control unit having the cache memory, comprising the steps of:
   controlling said cache memory in one of a plurality of cache control modes, including a loading mode and a record mode, which control modes determine a type of data transfer between said cache memory and a memory device connected to said control unit;
   dividing a memory area of said memory device connected to the control unit into a plurality of memory areas; and
   switching from one to another of the cache control modes for each memory area in accordance with an access status of each of the respective memory areas based on statistical information which represents a history of accesses to the memory areas in the memory device.

2. A method for controlling a cache memory according to claim 1 further comprising the steps of:
   counting a number of times of access in the respective divided memory areas from a processing unit connected to said control unit;
   counting a number of times of valid and invalid operation of the currently operating one of the cache control modes in the respective divided memory areas; and
   determining said access status based on the number of times of access and the number of times of valid and invalid operation of the cache control modes in the respective divided memory areas.

3. A method for controlling a cache memory according to claim 1 wherein the cache control modes said loading mode loads into the cache memory data accessed by a processing unit connected to the control unit and stored in a memory device connected to the control unit and data stored in said memory device adjacent to said data.

4. A method for controlling a cache memory according to claim 3, further comprising the steps of:
   counting a first number of times of access of a memory area from the processing unit connected to the control unit;
   counting a second number of the cases where no access was made to a loaded area in the cache memory after the loading thereof;
   calculating a ratio of the first number of times to the second number of times; and
   switching from the loading mode to the record mode of the cache control modes when the ratio exceeds a predetermined value.

5. A method for controlling a cache memory according to claim 3 wherein said control modes include record mode provides for loading into the cache memory only the data accessed from a preceding unit connected to the control unit and stored in a memory device connected to the control unit.

6. A method for controlling a cache memory according to claim 5, further comprising the steps of:
   counting a third number of times of access to the memory device from the processing unit connected to the control unit;
   counting a fourth number of times of access to data stored in the memory device connected to the control unit adjacent to the data loaded into the cache memory by the second mode;
   calculating a ratio of the third number of times to the fourth number of times; and
   switching from the record mode to the loading mode of the cache control modes when the ratio exceeds a predetermined value.

7. A data processing system comprising:
   a processor;
   at least one memory device; and
   a control unit connected to said processor and said memory device;
   said control unit including:
   a cache memory;
   control means for controlling said cache memory in one of a plurality of cache control modes, including a loading mode and a record mode, to access from said processor data stored in said memory device;
   dividing means for dividing said memory device connected to the control unit into a plurality of memory areas; and
   switching means for switching said control means from one to another of said plurality of cache control modes for each memory area in accordance with an access status of each of the respective divided memory areas depending on the current cache control mode thereof and a history of accesses to the memory areas in the memory device.

8. A method of controlling a cache memory by a control unit connected to at least one storage unit having a plurality of memory areas including at least one record, comprising the steps of:
   collecting, for each of said memory areas, statistical information which represents a history of accesses of the records in a memory area by read/write requests issued by a processor;
   selecting a group of records in a memory area to be loaded into said cache memory in according with said statistical information corresponding to said memory area, including at least one record designated by a read/write request received from said processor, when said at least one record designated by said read/write request does not exist in said cache memory.

9. A method of controlling a cache memory according to claim 8, wherein said selecting step includes:
   selecting at least one record designated by said read/write request from said memory area to be loaded into said cache memory in response to said statistical information.

10. A method of controlling a cache memory according to claim 8, wherein said selecting step includes:
selecting at least one record designated by said read/write request and other records which are included in the memory area with said one record designated by said read/write request, to be loaded into said cache memory, in response to said statistical information.

11. A method of controlling a cache memory according to claim 8, wherein said selecting step includes:
selecting said record designated by said read/write request and other records which are included in the memory area with said record designated by said read/write request and located behind said record, to be loaded into said cache memory, in response to said statistical information.

12. A method of controlling a cache memory according to claim 8, wherein said selecting step includes:
selecting all records which are included in the memory area with a record designated by said read/write request and located behind said record, to be loaded into said cache memory, in response to said statistical information.

13. A method of controlling a cache memory according to claim 8, wherein said selecting step further includes:
selecting no records to be loaded into said cache memory in response to said statistical information.

14. A method of controlling a cache memory according to claim 8, wherein said statistical information represents whether a frequency of access of records included in said memory area by read/write requests, during a period when said records existed in said cache memory after said records were loaded into said cache memory, is high or low.

15. A method of controlling a cache memory by a control unit having said cache memory and connected to at least one storage unit consisting of a plurality of memory areas including at least one record, comprising the steps of:
loading, into said cache memory from a memory area of said storage unit, at least one accessed record by a read/write request received from a processor when no records in said memory area including said at least one accessed record exist in said cache memory; and
loading, into said cache memory from said memory area of said storage unit, all records which are located behind said at least one accessed record in said memory area when any one of the records which are located behind said at least one accessed record in said memory area is accessed by a read/write request from the processor in a period when said at least one accessed record exists in said cache memory.

16. A method of controlling a cache memory by a control unit having said cache memory and connected to at least one storage unit consisting of a plurality of memory areas including at least one record, comprising the steps of:
loading, into said cache memory from a memory area of said storage unit, at least one accessed record by a read/write request received from a processor when records in said memory area including said at least one accessed record do not exist in said cache memory; and
loading, into said cache memory from said memory area of said storage unit, all records which are located in front of said at least one accessed record in said memory area when any one of the records which are located in front of said at least one accessed record in said memory area is accessed by a read/write request from the processor in a period when said at least one accessed record exists in said cache memory.

17. A method of controlling a cache memory by a control unit having said cache memory and connected to at least one storage unit consisting of a plurality of memory areas including at least one record, comprising the steps of:
loading, into said cache memory from a memory area of said storage unit, at least one accessed record by a read/write request received from a processor when no records in said memory area including said at least one accessed record exist in said cache memory; and
loading, into said cache memory from said memory area of said storage unit, all records except at least one accessed record in said memory area when any one of the records which are located in front of said at least one accessed record in said memory area is accessed by a read/write request from the processor in a period when said at least one accessed record exists in said cache memory.

18. A method of controlling a cache memory by a control unit having said cache memory and connected to at least one storage unit consisting of a plurality of memory areas including at least one record, comprising the steps of:
loading, into said cache memory from a memory area of said storage unit, at least one accessed record by a read/write request received from a processor when no records in said memory area including said at least one accessed record exist in said cache memory; and
loading, into said cache memory from said memory area of said storage unit, all records except said at least one accessed record in said memory area when any one of the records except in said at least one accessed record in said memory area is accessed by a read/write request from the processor in a period when said at least one accessed record exists in said cache memory.

19. A method of controlling a cache memory by a control unit connected to at least one storage unit having a plurality of memory areas including at least one record, comprising the steps of:
collecting, for each said memory area, statistical information which represents accessibility of the records in a memory area by read/write requests issued by a processor;
recognizing whether or not a read/write request received from a processor is a sequential access request;
selecting a group of records loaded into said cache memory in accordance with statistical information corresponding to said memory area including at least one record which is accessed by said read/write request received from the processor when said at least one record which is accessed by said read/write request does not exist in said cache memory and it is recognized that said read/write request received from the processor is not a sequential access request.

20. A storage system, comprising:
a control unit having a cache memory; and at least one storage unit connected to said control unit and having a plurality of memory areas including at least one record;
said control unit including:
means for collecting, for each of said memory areas, statistical information which represents a history of accesses of the records in a memory area by read/write requests received from a processor;
means for selecting a group of records to be loaded into said cache memory in accordance with said statistical information corresponding to said designated memory area, including at least on record designated by a read/write request received from said processor, when said at least one record designated by said read/write request does not exist in said cache memory.

21. A storage system according to claim 20, said selecting means including:
means for selecting only at least one record designated by said read/write request to be loaded into said cache memory in response to said statistical information.

22. A storage system according to claim 20, said selecting means including:
means for selecting at least one record designated by said read/write request and other records which are included in the memory area with said one record designated by said read/write request, to be loaded into said cache memory, in response to said statistical information.

23. A storage system according to claim 20, said selecting means including:
means for selecting at least one record designated by said read/write request and other records which are included in the memory area with said one record designated by said read/write request and located behind said at least one record, to be loaded into said cache memory, in response to said statistical information.

24. A storage system according to claim 20, said selecting means including:
means for selecting all records which are included in the memory area with at least one record designated by said read/write request and located behind said record, to be loaded into said cache memory, in response to said statistical information.

25. A storage system according to claim 20, said selecting means further including:
means for selecting no records to be loaded into said cache memory in response to said statistical information.

26. A storage system according to claim 20, wherein said statistical information represents whether frequency of access of records included in said memory area by read/write requests, during a period when said records existed in said cache memory after said records were loaded into said cache memory, is high or low.

27. A storage system, comprising:
a control unit having a cache memory; and
at least one storage unit connected to said control unit and having a plurality of memory areas including at least one record;
said control unit including:
means for loading, into said cache memory from a memory area, at least one accessed record by a read/write request received from a processor when no records in said memory area including at least one accessed record exist in said cache memory; and
means for loading, into said cache memory from said memory area, all records which are located behind said at least one accessed record in said memory area when any one of the records which are located behind said at least one accessed record in said memory area is accessed by a read/write request from the processor in a period when said at least one accessed record exists in said cache memory.

28. A storage system, comprising:
a control unit having a cache memory; and
at least one storage unit connected to said control unit and having a plurality of memory areas including at least one record;
said control unit including:
means for loading, into said cache memory from a memory area, at least one accessed record by a read/write request received from a processor when records in said memory area including at least one accessed record do not exist in said cache memory; and
means for loading, into said cache memory from said memory area, all records which are located in front of said at least one accessed record in said memory area when any one of the records which are located in front of said at least one accessed record in said memory area is accessed by a read/write request from the processor in a period when said at least one accessed record exists in said cache memory.

29. A storage system, comprising:
a control unit having a cache memory; and
at least one storage unit connected to said control unit and having a plurality of memory areas including at least one record;
said control unit including:
means for loading, into said cache memory from a memory area, at least one accessed record by a read/write request received from a processor when no records in said memory area including at least one accessed record exist in said cache memory; and
means for loading, into said cache memory from said memory area, all records except said at least one accessed record in said memory area when any one of the records which are located in front of said at least one accessed record in said memory area is accessed by a read/write request from the processor in a period when said at least one accessed record exists in said cache memory.

30. A storage system, comprising:
a control unit having a cache memory; and
at least one storage unit connected to said control unit and having a plurality of memory areas including at least one record;
said control unit including:
means for loading, into said cache memory from a memory area, at least one accessed record by a read/write request received from a processor when no records in said memory area including at least one accessed record exist in said cache memory; and
means for loading, into said cache memory from said memory area, all records except said at least one accessed record in said memory area when any one of the records except said at least one accessed record in said memory area is accessed by a read/write request from the processor in a period when said at least one accessed record exists in said cache memory.

31. A storage system, comprising:
a control unit having a cache memory; and
at least one storage unit connected to said control unit and having a plurality of memory areas including at least one record;
said control unit including:
means for collecting, for each said memory area, statistical information which represents accessibility of the records on said memory area by read/write request received from a processor;
means for recognizing whether or not a read/write request received from a processor is a sequential access request;
means for selecting a group of records loaded into said cache memory in accordance with statistical information corresponding to said memory area including at least one record which is accessed by said read/write request received from said processor when said at least one record which is accessed by said read/write request does not exist in said cache memory and it is recognized that said read/write request received from the processor is not a sequential access request.

* * * * *